US012808497B2

(12) United States Patent
Goldman et al.

(10) Patent No.: US 12,808,497 B2
(45) Date of Patent: Nov. 24, 2026

(54) FOCUSING OPTIC FOR PORTABLE LIGHT

(71) Applicant: Coast Cutlery Co., Portland, OR (US)

(72) Inventors: David Goldman, Portland, OR (US); Chi Him Wong, Kowloon (HK)

(73) Assignee: Coast Cutlery Co., Portland, OR (US)

( * ) Notice: Subject to any disclaimer, the term of this patent is extended or adjusted under 35 U.S.C. 154(b) by 0 days.

(21) Appl. No.: 19/440,510

(22) Filed: Jan. 5, 2026

(65) Prior Publication Data

US 2026/0210504 A1 Jul. 23, 2026

Related U.S. Application Data

(60) Provisional application No. 63/747,268, filed on Jan. 20, 2025.

(51) Int. Cl.

| | |
|---|---|
| ***F21L 4/04*** | (2006.01) |
| ***F21V 14/06*** | (2006.01) |
| ***F21V 17/02*** | (2006.01) |
| ***F21V 21/088*** | (2006.01) |
| ***F21V 23/04*** | (2006.01) |
| ***F21Y 115/10*** | (2016.01) |

(52) U.S. Cl.

CPC ............ *F21L 4/045* (2013.01); *F21V 14/065* (2013.01); *F21V 17/02* (2013.01); *F21V 21/0885* (2013.01); *F21V 23/0414* (2013.01); *F21Y 2115/10* (2016.08)

(58) Field of Classification Search

CPC ........ F21L 4/04–045; F21V 14/00–065; F21V 17/02–06; F21V 21/0885; F21V 23/0414; F21Y 2115/10

See application file for complete search history.

(56) References Cited

U.S. PATENT DOCUMENTS

| | | | |
|---|---|---|---|
| 4,398,238 | A | 8/1983 | Nelson |
| 4,777,754 | A | 10/1988 | Reynolds, Jr. |
| 4,856,218 | A | 8/1989 | Reynolds, Jr. |
| 5,628,555 | A | 5/1997 | Sharrah et al. |
| 6,276,088 | B1 | 8/2001 | Matthews et al. |
| 6,345,464 | B1 | 2/2002 | Kim et al. |
| 6,378,237 | B1 | 4/2002 | Matthews et al. |
| 6,609,810 | B2 | 8/2003 | Kim |
| 6,622,416 | B2 | 9/2003 | Kim |
| 7,076,908 | B2 | 7/2006 | Kim |
| 7,117,624 | B2 | 10/2006 | Kim |
| 7,188,978 | B2 | 3/2007 | Sharrah et al. |
| D548,385 | S | 8/2007 | Sharrah et al. |
| 7,273,292 | B2 | 9/2007 | Kim |
| 7,310,903 | B2 | 12/2007 | Kim |
| 7,325,352 | B2 | 2/2008 | Matthews et al. |
| 7,332,682 | B2 | 2/2008 | Kim |

(Continued)

*Primary Examiner* — Jason M Han

(74) *Attorney, Agent, or Firm* — Schwabe, Williamson & Wyatt, P.C.

(57) ABSTRACT

Embodiments disclosed herein include a focusing mechanism for a portable light. A light assembly is provided that allows adjustment of the beam pattern between a spot beam and a flood beam, without increasing the length of the light assembly. The light assembly includes an optic portion (an optic) and a body. The optic can include an outer collar, an optic assembly, an inner collar and a head frame assembly. A spring presses the outer collar forward to lock it in place. The outer collar is pulled back slightly by the user, then rotated and released to change the beam type. The light can be a hand-held light or mounted to an object such as a firearm.

20 Claims, 17 Drawing Sheets

(56) References Cited

U.S. PATENT DOCUMENTS

| | | | |
|---|---|---|---|
| 7,334,365 B2 | 2/2008 | Kim |
| 7,334,366 B2 | 2/2008 | La France |
| 7,360,333 B2 | 4/2008 | Kim |
| 7,395,627 B2 | 7/2008 | La France et al. |
| 7,421,817 B2 | 9/2008 | Larsson |
| 7,438,430 B2 | 10/2008 | Kim |
| 7,441,918 B2 | 10/2008 | Kim |
| 7,591,098 B2 | 9/2009 | Matthews et al. |
| 7,614,760 B2 | 11/2009 | Sharrah et al. |
| D612,970 S | 3/2010 | Sharrah et al. |
| 7,712,242 B2 | 5/2010 | Matthews et al. |
| 7,941,960 B2 | 5/2011 | Matthews et al. |
| 8,127,484 B2 | 3/2012 | Matthews et al. |
| 8,182,109 B2 | 5/2012 | Matthews et al. |
| D674,525 S | 1/2013 | Sharrah et al. |
| 8,371,729 B2 | 2/2013 | Sharrah et al. |
| 8,613,534 B2 | 12/2013 | Jigamian et al. |
| D712,001 S | 8/2014 | Wells |
| 8,936,380 B2 | 1/2015 | Jigamian |
| 8,944,626 B2 | 2/2015 | Matthews et al. |
| 9,004,729 B2 | 4/2015 | Jigamian |
| 9,228,804 B2 | 1/2016 | Syrengelas et al. |
| 9,423,102 B2 | 8/2016 | Jigamian et al. |
| 9,551,550 B2 | 1/2017 | Wells |
| D781,983 S | 3/2017 | Wells |
| D796,622 S | 9/2017 | Sharrah |
| 9,772,163 B2 | 9/2017 | Sharrah et al. |
| 9,784,435 B2 | 10/2017 | Jigamian et al. |
| 10,001,342 B2 | 6/2018 | Sharrah et al. |
| 10,295,128 B2 | 5/2019 | Sharrah et al. |
| 10,344,959 B2 | 7/2019 | Worman et al. |
| D857,268 S | 8/2019 | Worman |
| D857,960 S | 8/2019 | Worman |
| 10,612,732 B2 | 4/2020 | Sharrah et al. |
| 10,612,761 B1 | 4/2020 | Worman et al. |
| D885,510 S | 5/2020 | Wells et al. |
| 10,670,251 B1 | 6/2020 | Hawk et al. |
| 10,697,623 B2 | 6/2020 | Worman et al. |
| D898,260 S | 10/2020 | Worman |
| D898,261 S | 10/2020 | Worman |
| D907,267 S | 1/2021 | Worman |
| D907,268 S | 1/2021 | Worman |
| D907,269 S | 1/2021 | Worman |
| D907,270 S | 1/2021 | Worman |
| 10,928,061 B2 | 2/2021 | Rasi et al. |
| D913,553 S | 3/2021 | Worman |
| D913,554 S | 3/2021 | Worman |
| 10,948,266 B2 | 3/2021 | Wells et al. |
| D919,149 S | 5/2021 | Worman |
| D919,150 S | 5/2021 | Worman |
| 11,092,323 B2 | 8/2021 | Hawk et al. |
| 11,162,665 B2 | 11/2021 | Worman |
| 11,181,258 B2 | 11/2021 | Worman |
| 11,506,366 B2 | 11/2022 | Sharrah et al. |
| D997,285 S | 8/2023 | Worman |
| D997,413 S | 8/2023 | Sharrah et al. |
| D999,624 S | 9/2023 | Sharrah et al. |
| D1,005,541 S | 11/2023 | Worman |
| D1,013,501 S | 2/2024 | Sharrah et al. |
| 2005/0079746 A1 | 4/2005 | Seith et al. |
| 2008/0168696 A1 | 7/2008 | Orne et al. |
| 2009/0091925 A1 | 4/2009 | Hesse et al. |
| 2011/0076095 A1 | 3/2011 | Storch et al. |
| 2011/0080736 A1 | 4/2011 | Brands et al. |
| 2012/0268920 A1 | 10/2012 | Matthews et al. |
| 2016/0102947 A1 | 4/2016 | Visinski et al. |
| 2019/0301835 A1 | 10/2019 | Tayon et al. |
| 2020/0103094 A1 | 4/2020 | Stevenson et al. |
| 2020/0200508 A1 | 6/2020 | Teetzel et al. |
| 2020/0240750 A1 | 7/2020 | Reed et al. |
| 2021/0337679 A1 | 10/2021 | Roth |
| 2022/0082215 A1 | 3/2022 | Jones |
| 2023/0184517 A1 | 6/2023 | Davis et al. |
| 2023/0288159 A1 | 9/2023 | Kastrun et al. |
| 2024/0110758 A1 | 4/2024 | Roe et al. |
| 2024/0142201 A1 | 5/2024 | Kilgore |

FOCUSING OPTIC FOR PORTABLE LIGHT

PRIORITY CLAIM

This application claims the benefit of U.S. provisional patent application No. 63/747,268, filed Jan. 20, 2025, titled "Focusing Optic For Firearm-Mounted Light," which is incorporated herein by reference.

TECHNICAL FIELD

Embodiments herein relate to a focusing mechanism for a portable light.

BACKGROUND

A portable light is useful in many situations. For example, a hand-held light is useful during a power outage or while camping, hiking or participating in other outdoor nighttime activities. In another example, a portable light can be mounted to an object such as a bicycle or helmet to improve visibility at night.

In another example, a portable light can be mounted to a firearm to allow identification of a threat in a low light scenario. This type of light can typically be added as an accessory to an existing handgun using an integrated rail, e.g., a Picatinny or Weaver style rail, under a barrel of the handgun.

However, various challenges are encountered in designing portable lights.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1A:
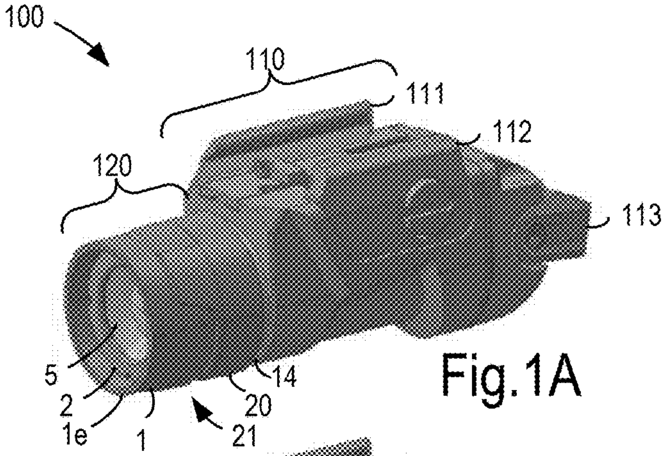
FIG. 1A depicts an example light assembly 100 locked in a flood beam position, in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

As mentioned at the outset, various challenges are presented in designing a portable light.

Some light assemblies can attach to an integrated rail of a handgun or other firearm. In one approach, the light assembly attaches below the barrel, proximate to the trigger so that the user can easily activate an on-off switch at the rear of the light assembly. Typically, the light assembly is installed and kept in place on the firearm for later use. One challenge is the need for a holster that is fitted to accommodate a fixed amount of space taken up by the light. Another challenge is that the beam pattern is typically fixed.

The solutions provided herein address the above and other issues. In one aspect, a portable light assembly is provided that allows adjustment of the beam pattern, e.g., between a spot beam and a flood beam, without increasing the length of the light assembly. In some implementations, the light assembly can be mounted to a standardized rail of a handgun or other firearm. In other implementations, the portable light can be mounted to an object other than a firearm or can be a hand-held light, e.g., a flashlight. The light assembly further enables the user to easily change the beam pattern and to lock the light assembly with the desired beam pattern in place.

In an example implementation, the light assembly includes an optic portion (an optic) and a body. The body can include opposing clamping members that attach to a mounting rail of a firearm, such as under the barrel of a handgun. The body can include associated components for the optic such as a battery and switches. The optic portion can be attached to or removed from the body via a threaded coupling.

The optic can include an outer collar, an optic assembly, an inner collar and a head frame assembly. A spring presses the outer collar forward to lock it in place. The outer collar is pulled back slightly by the user, then rotated and released to change the beam type. The lock prevents the optic from changing modes and can resist weapon recoil. The optic is engineered to have a clean spot beam position and a clean flood beam position, so having the outer collar lock into these two modes encourages the best quality beam to be used.

In an example implementation, the light assembly includes a front bezel, a lens, and a light source such as one or more incandescent bulbs or one or more light-emitting diodes (LEDs), where the front bezel and the lens move forward or aft while the light source remains fixed in place to provide the spot or flood beam positions, respectively. The length of the light assembly does not increase when the spot beam position is selected, so that an existing holster can accommodate the gun with the light assembly regardless of the beam type that is set.

The light assembly can include components made of appropriate materials such as metal or plastic.

Although the light assembly is depicted in some example implementations as a firearm-mounted light, other implementations are possible. For example, the light assembly could be mounted to a rail on a crossbow. Or, the light assembly can be used as a standalone hand-held light.

The above and other features will be apparent from the following detailed discussion.

FIGS. 1A-1D depict an example light assembly 100 (or light accessory) in stages that show a transition from locked in a flood beam, to unlock, to changing to a spot beam, to locked in the spot beam, respectively, in accordance with various embodiments.

An optic 120 attaches to the light assembly body 110. The body includes opposing clamping members 111 and 112 (or arms) that can attach to a mounting rail of a firearm, such as under the barrel of a handgun. See also FIGS. 12A and 12B. The optic 120 includes an outer collar 21 comprising an outer collar front 1 and an outer collar rear 20. These two components may have corresponding threaded surfaces to attach to one another. Part of a front bezel 2 and a lens 5 of an optic assembly 22 (FIG. 2B) are visible at the front of the light assembly 100, within the outer collar front 1. Part of a head frame 14 is visible behind the outer collar rear 20. One or more switches 113 can be provided on the back side of the light assembly body 110 to turn the light on or off. Other functions such high, low or strobe could also be provided.

In FIG. 1A, the light assembly 100 is locked in a position in which it provides a flood beam, in accordance with various embodiments. In this position, the front bezel 2 and a lens 5 are moved back from a front edge 1*e* of the outer collar front 1.

Figure 1E:
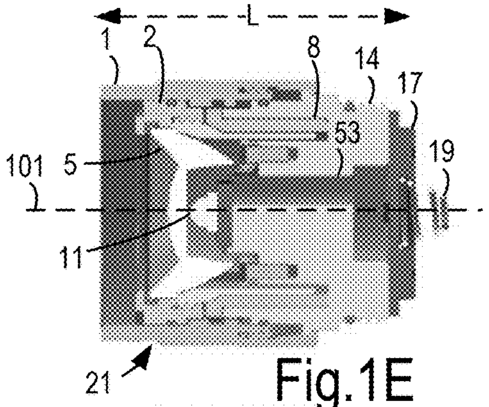
FIG. 1E depicts a cross-sectional view of the optic 120 in the configuration of FIG. 1A, in accordance with various embodiments.
Figure 1B:
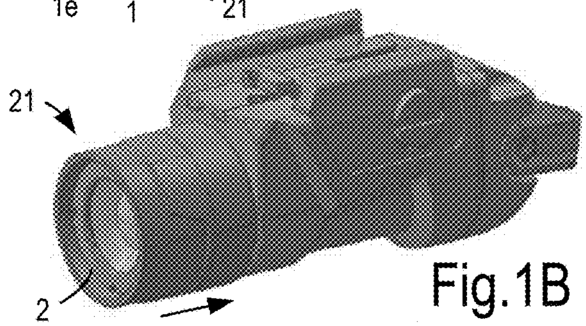
FIG. 1B depicts the example light assembly 100 in an unlocked position, in accordance with various embodiments.

In FIG. 1B, the collar is pulled back slightly by the user in the direction of the arrow to unlock the optic, in accordance with various embodiments. The collar may be pulled back until the outer collar rear 20 reaches a front part of the light assembly body 110, for example.

Figure 1F:
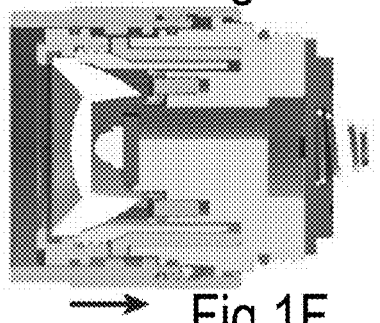
FIG. 1F depicts a cross-sectional view of the optic 120 in the configuration of FIG. 1B, in accordance with various embodiments.
Figure 1C:
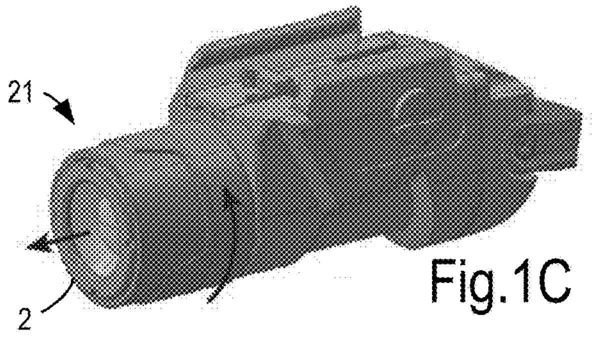
FIG. 1C depicts the example light assembly 100 changed to a spot beam position, in accordance with various embodiments.

In FIG. 1C, the user rotates the collar to change the optic mode from flood beam to spot beam, while the collar is still pulled back, in accordance with various embodiments. The front bezel 2 and lens 5 move forward. The lens 5 moves forward relative to the light source 11 so that the beam is more narrowly focused than in FIG. 1A.

Figure 1G:
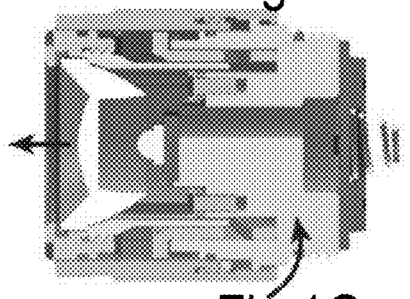
FIG. 1G depicts a cross-sectional view of the optic 120 in the configuration of FIG. 1C, in accordance with various embodiments.
Figure 1D:
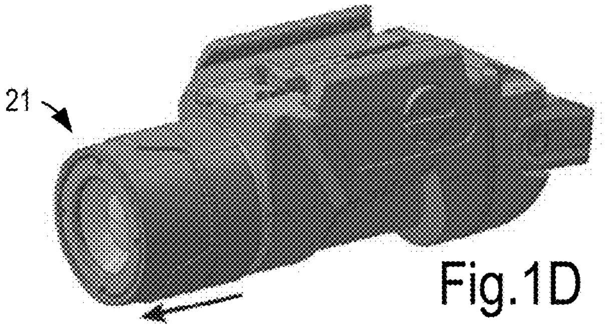
FIG. 1D depicts the example light assembly 100 locked in the spot beam position, in accordance with various embodiments.

In FIG. 1D, the user release the collar to allow it to spring forward to lock the collar with the optic in the spot beam position, in accordance with various embodiments.

FIGS. 1E-1H depicts cross-sectional views of the optic 120 of FIGS. 1A-1D, respectively, in accordance with various embodiments. Advantageously, the optic does not increase in length (L) in the spot beam position compared to the flood beam position. This feature can be realized by the outer collar fully encapsulating the moving optic assembly. This ensures the outer dimensions of the light don't change between modes when the outer collar is in the locked position. This is advantageous for compatibility with holsters. That is, since the length of the light does not increase in the spot beam position, the fixed shape of the holster can accommodate the light with the optic in either mode.

FIG. 1E depicts the outer collar front 1, front bezel 2, lens 5 and head frame 14 of FIG. 1A, in accordance with various embodiments. Also shown are a longitudinal axis 101 of the optic 120 or head frame assembly, a light source 11, an inner collar 8, a head tail cap 17, and a contact spring 19 that is coupled to a battery in the light assembly body 110. A passageway or channel 53 is for one or more wires between the contact spring 19 and the light source 11. The light source can include one or more LEDs, for example, that tend to emit in the blue-white spectrum. An axial direction is a direction parallel to the longitudinal axis.

FIG. 1F depicts the collar being pulled back rearward along the axis by the user, in accordance with various embodiments.

FIG. 1G depicts the collar being rotated by the user, causing the front bezel 2 and lens 5 to move forward, in accordance with various embodiments.

Figure 1H:
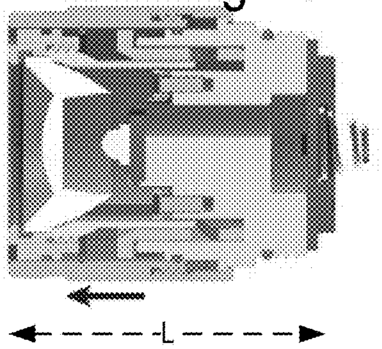
FIG. 1H depicts a cross-sectional view of the optic 120 in the configuration of FIG. 1D, in accordance with various embodiments.

FIG. 1H depicts the collar moving forward by a spring force to lock the optic in the spot beam position, in accordance with various embodiments.

Figure 2A:
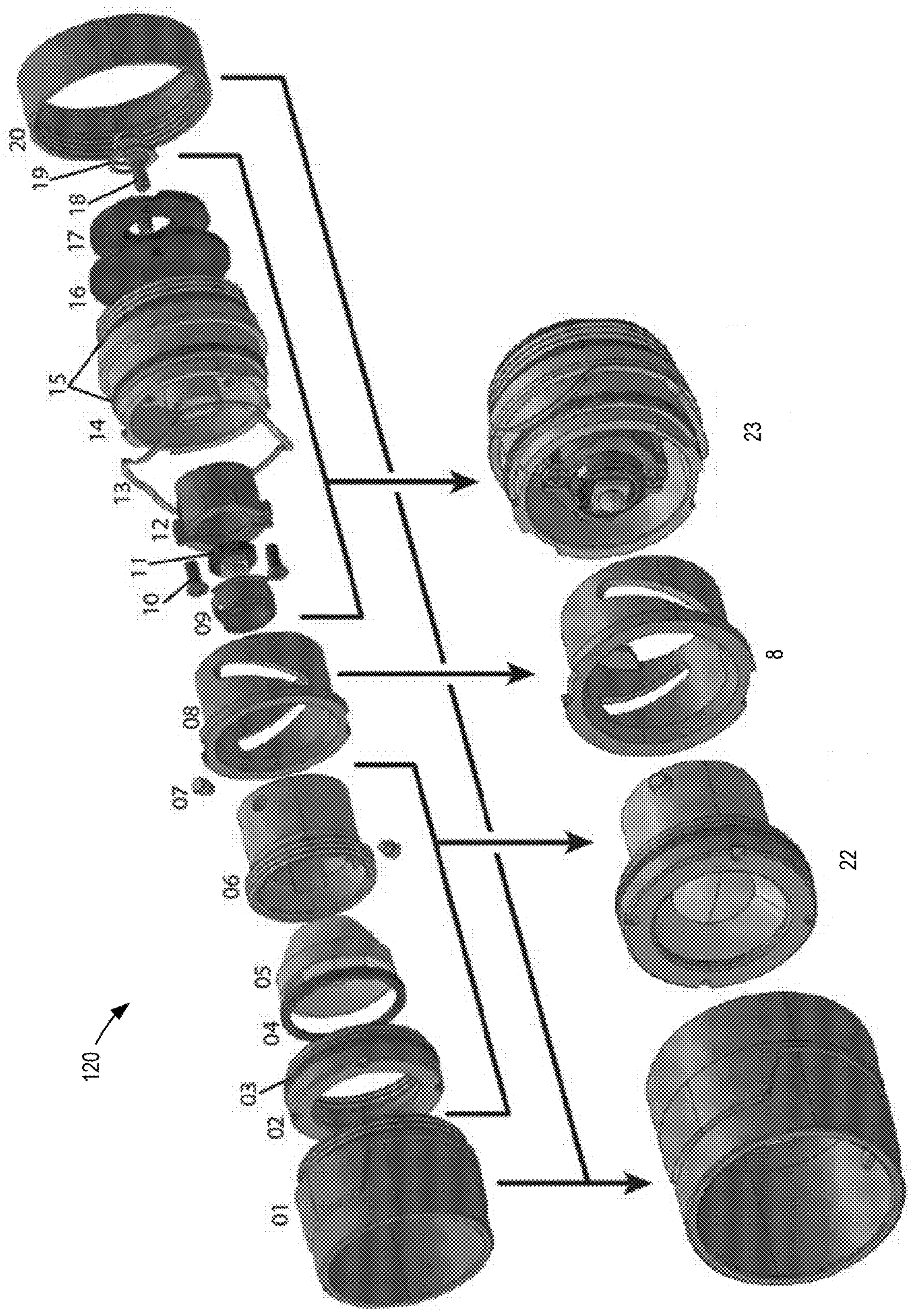
FIG. 2A depicts an example exploded view of the optic 120 of FIGS. 1A-1H, in accordance with various embodiments.

FIG. 2A depicts an example exploded view of the optic 120 of FIGS. 1A-1H, in accordance with various embodiments. A number of components can be defined as follows: outer collar front 1, front bezel 2, bezel O-ring 3, optic gasket 4, optic 5 (or lens), optic carrier 6, cam follower (2×) 7, inner collar 8, LED sleeve 9, head inner screws 10, LED 11, alignment track 12, wave spring 13, head frame 14, head O-ring (2×) 15, printed circuit board (PCB) 16, head tail cap 17, head cap screw (2×) 18, contact spring 19, and outer collar rear 20.

In an example embodiment, the optic has four major subassemblies, including the outer collar 21, the optic assembly 22, the inner collar 8 and the head frame assembly 23.

The frontward direction is to the left and the rearward direction is to the right.

Figure 2B:
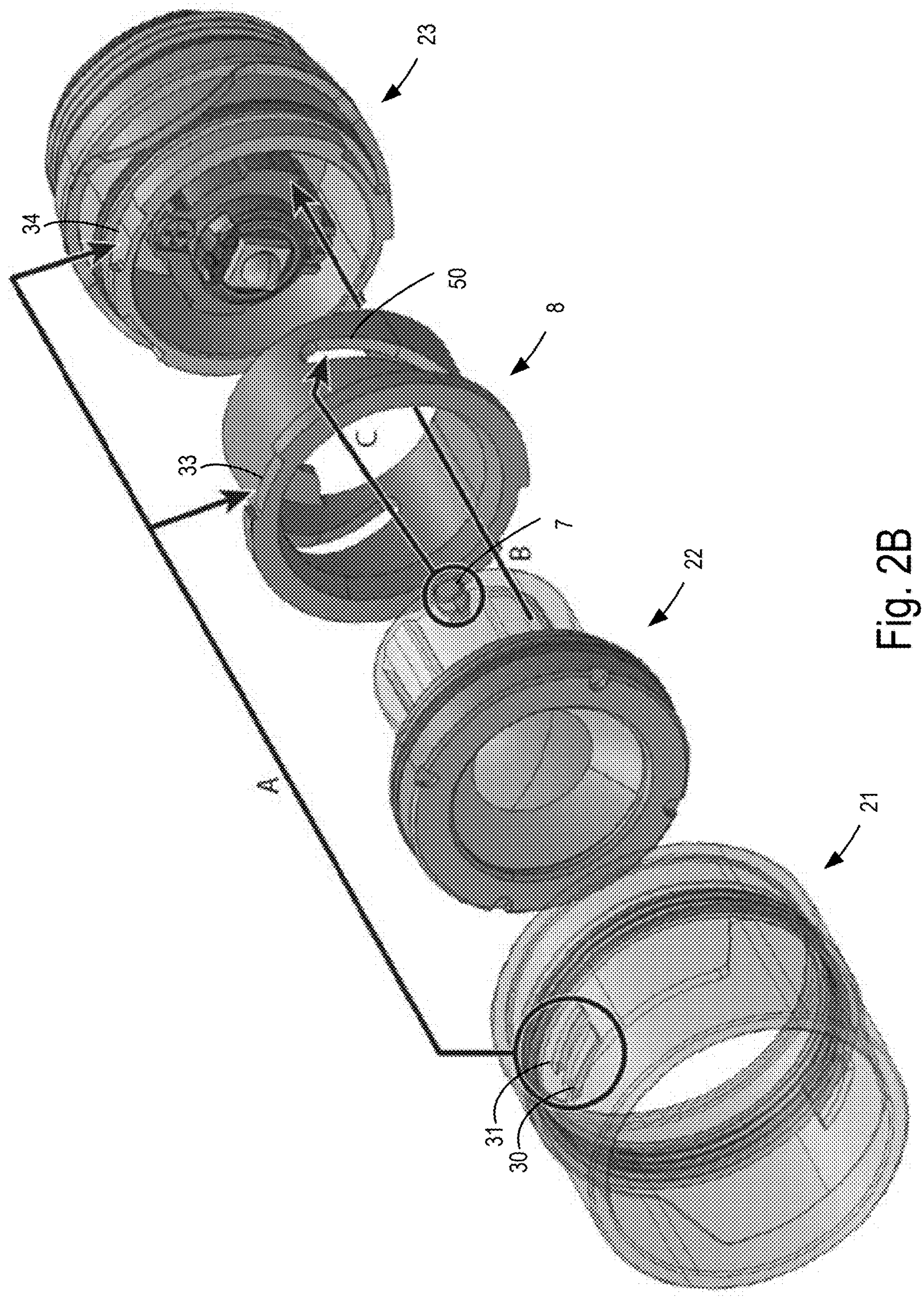
FIG. 2B depicts interactions between the outer collar 21, optical assembly 22, inner collar 8 and head frame assembly 23 of FIG. 2A, in accordance with various embodiments.

FIG. 2B depicts interactions between the outer collar 21, optical assembly 22, inner collar 8 and head frame assembly 23 of FIG. 2A, in accordance with various embodiments. Arrow "A" denotes how tabs 30 and 31 on the inside of the outer collar 21 interface with a notch 33 on the inner collar 8 and a notch 34 on the head frame assembly 23. A set of the tabs can be provided on opposing sides of the outer collar 21. The notch 33 can also be provided on opposing sides of the inner collar 8 and head frame assembly 23. The tabs and notches are used to lock the outer collar and prevent rotation, and transfer rotation to the inner collar. Arrow "B" denotes how tracks inside the optic assembly ride along tracks of the head frame assembly 23. This prevents the optic assembly from rotating, but allows the linear motion in the axial direction required to change the distance between the LED and the optic. Arrow "C" denotes how follower pins 7 of the optic assembly ride along grooves 50 in the inner collar 8, acting as a barrel cam that turns the rotation of the inner collar into linear movement of the optic assembly in the axial direction.

Figure 3A:
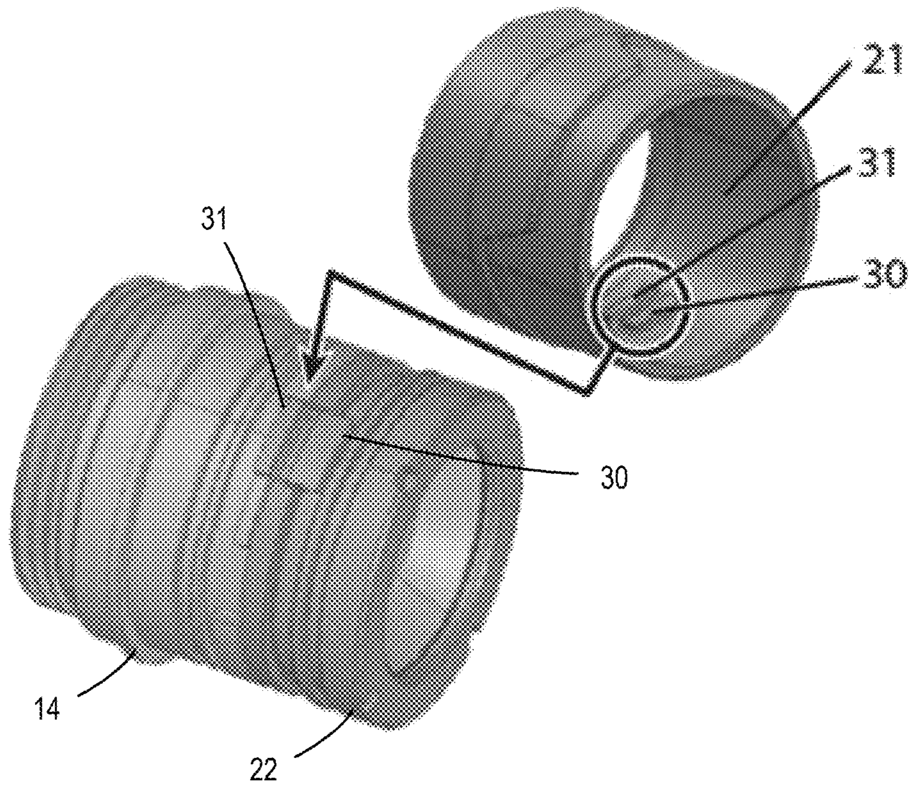
FIG. 3A depicts the tabs 30 and 31 of the outer collar 21 that engage with the head frame 14 and the optic assembly 22 in the flood beam position, consistent with FIG. 2B, in accordance with various embodiments.

FIG. 3A depicts the tabs 30 and 31 of the outer collar 21 that engage with the head frame 14 and the optic assembly 22 in the flood beam position, consistent with FIG. 2B, in accordance with various embodiments.

FIGS. 3B-3E depict the head frame 14, the optic assembly 22 and the tabs 30 and 31 in stages that show a transition from locked in the flood beam position (consistent with FIG. 3A), to unlock, to changing to a spot beam, to locked in the spot beam, respectively, in accordance with various embodiments.

Figure 3B:
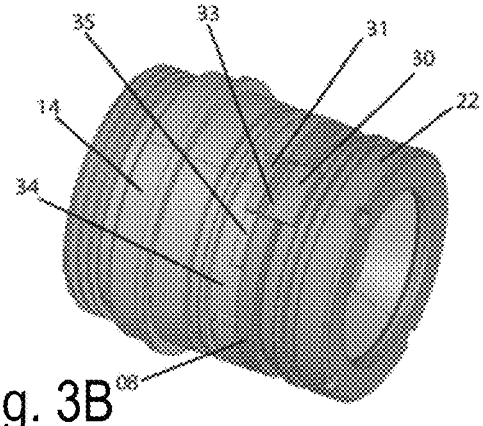
FIG. 3B depicts the head frame 14, the optic assembly 22 and the tabs 30 and 31 of FIG. 3A locked in the flood beam position. in accordance with various embodiments.

FIG. 3B depicts the head frame 14, the optic assembly 22 and the tabs 30 and 31 of FIG. 3A locked in the flood beam position, in accordance with various embodiments. This shows the natural resting state of the optic in the flood beam position. A spring 13 is pressing the outer collar 21 forward, locking it in place. The locking tab 31 of the outer collar 21 is held in position by the locking block 35 on the head frame 14.

Figure 3F:
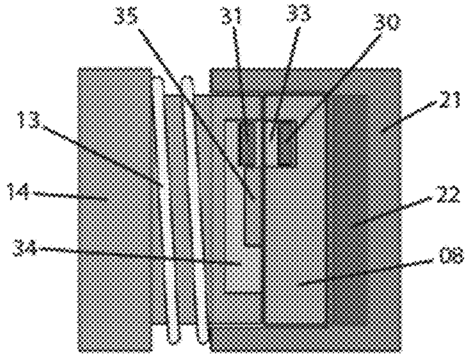
FIG. 3F depicts a cutaway view of the outer collar in the configuration of FIG. 3B, in accordance with various embodiments.
Figure 3C:
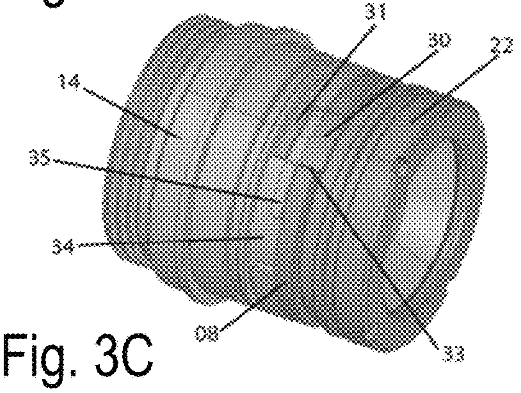
FIG. 3C shows the outer collar 21 being pulled back, compressing the spring 13, in accordance with various embodiments.

FIG. 3C shows the outer collar 21 being pulled back, compressing the spring 13, in accordance with various embodiments. The locking tab 31 shifts rearward, clearing the locking block 35. The transfer tab 30 also shifts rearward but stays within the inner collar channel 33.

Figure 3G:
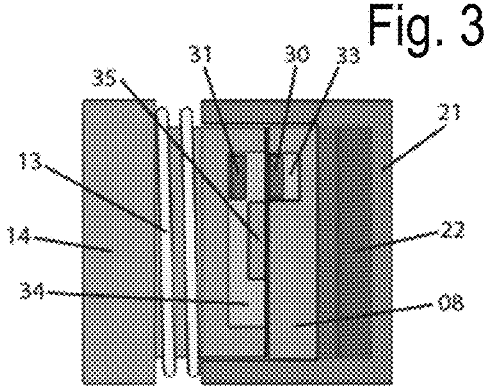
FIG. 3G depicts a cutaway view of the outer collar in the configuration of FIG. 3C, in accordance with various embodiments.
Figure 3D:
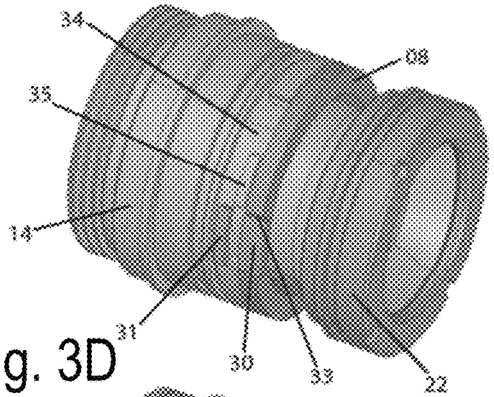
FIG. 3D shows the outer collar 21 being rotated, in accordance with various embodiments.

FIG. 3D shows the outer collar 21 being rotated, in accordance with various embodiments. The locking tab 31 travels along the locking channel 34, moving past the locking block 35. The transfer tab 30 stays within the inner collar channel 33, rotating the inner collar 8 in concert with the outer collar 21. The barrel cam grooves 50 (FIG. 2B) of the rotating inner collar 8 act against the cam followers 7 (FIG. 2B) of the optic assembly 22, converting rotation into linear movement, which advances the optic assembly 22 forward, increasing the distance between it and the LED 11 (FIG. 2A), changing the flood beam position to the spot beam position.

Figure 3H:
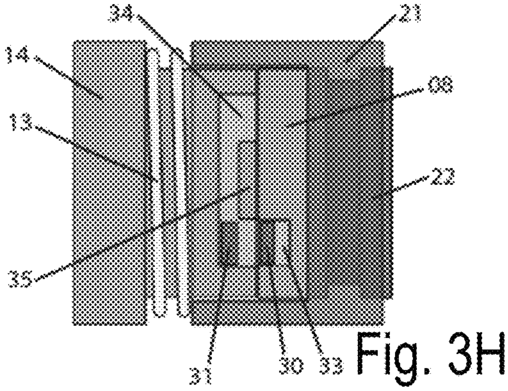
FIG. 3H depicts a cutaway view of the outer collar in the configuration of FIG. 3D, in accordance with various embodiments.
Figure 3E:
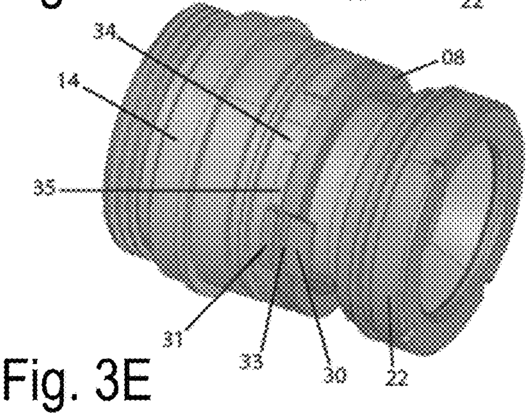
FIG. 3E shows when the spring 13 presses the outer collar 21 forward, positioning the locking block 35 next to the locking tab 31, thus locking the outer collar 21 in place, in accordance with various embodiments.

FIG. 3E shows when the spring 13 presses the outer collar 21 forward, positioning the locking block 35 next to the locking tab 31, thus locking the outer collar 21 in place, in accordance with various embodiments. The transfer tab 30 stays within the inner collar channel 33, retaining the optic assembly 22 spot beam position.

FIGS. 3F-3I depicts cutaway views of the outer collar, highlighting the movement of tabs 30 and 31 and their interaction with the components of FIGS. 3B-3E, respectively, in accordance with various embodiments. The spring 13 is depicted as a coil spring rather than a wave spring in this example.

FIG. 3F depicts a cutaway view of the outer collar in the configuration of FIG. 3B, in accordance with various embodiments.

FIG. 3G depicts a cutaway view of the outer collar in the configuration of FIG. 3C, in accordance with various embodiments.

FIG. 3H depicts a cutaway view of the outer collar in the configuration of FIG. 3D, in accordance with various embodiments.

Figure 3I:
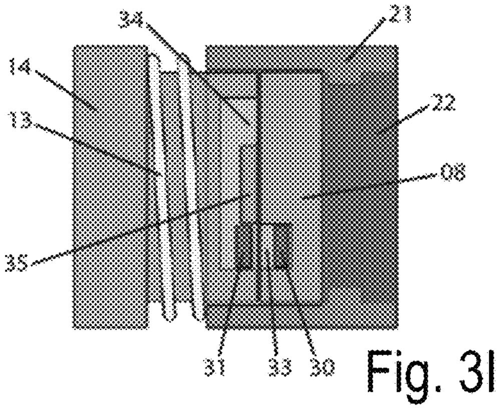
FIG. 3I depicts a cutaway view of the outer collar in the configuration of FIG. 3E, in accordance with various embodiments.

FIG. 3I depicts a cutaway view of the outer collar in the configuration of FIG. 3E, in accordance with various embodiments.

Figure 4A:
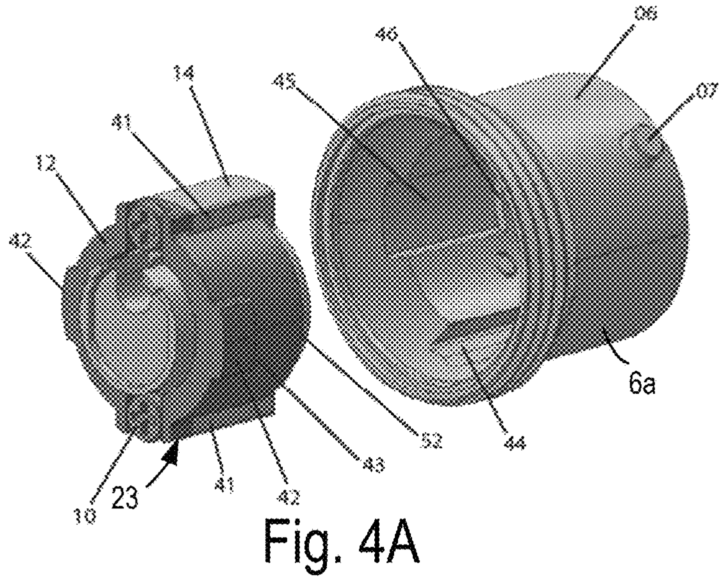
FIG. 4A depicts an alignment track 12 assembled into a partial view of the head frame 14, separated from an optic carrier 6, in accordance with various embodiments.

FIG. 4A depicts an exploded partial view of the head frame 14 of FIG. 3A and an alignment track 12 separated from an optic carrier 6, in accordance with various embodiments. The full-length tracks 41 of the head frame 14 and the alignment track 12 align with the full-length keyways 44 in an interior of the optic carrier 6, and the short tracks 42 of the alignment track 12 align with the shorter keyways 45 in the interior of the optic carrier 6.

The optic carrier 6 has a cylindrical body 6*a*.

Figure 4B:
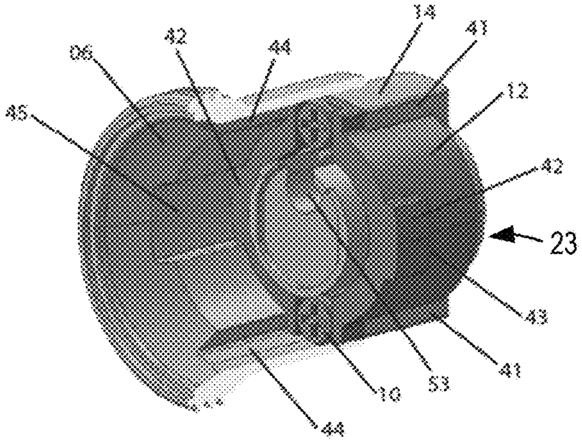
FIG. 4B depicts an alignment track 12 assembled into a partial view of the head frame 14, combined with a partial view of the optic carrier 6 of FIG. 4A, in accordance with various embodiments.

FIG. 4B depicts an alignment track 12 assembled into a partial view of the head frame 14, combined with a partial view of the optic carrier 6 of FIG. 4A, in accordance with various embodiments. The optic carrier 6 can move linearly in relation to the head frame assembly 23, but the tracks 41 and 42 and keyways 44 and 45 prevent rotation. When the alignment track 12 is secured to the head frame 14 with the head inner screws 10, travel of the optic carrier 6 is limited by the travel stop 46 of the short keyway 45 of the optic carrier 6 bottoming out against the travel stop 43 of the short track 42 of the alignment track 12.

Figure 4C:
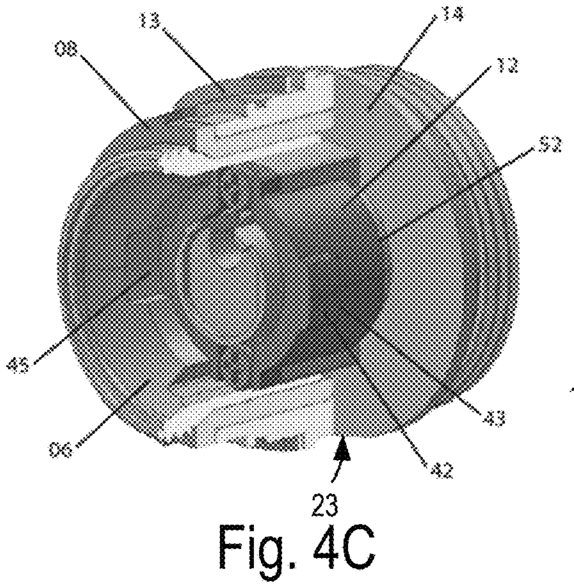
FIG. 4C depicts a cutaway view of the optic carrier 6 of FIG. 4B in the flood beam position, in accordance with various embodiments.

FIG. 4C depicts a cutaway view of the optic carrier 6 of FIG. 4B in the flood beam position, in accordance with various embodiments. The optic carrier 6 is recessed into the head frame assembly 23 as far as it goes.

Figure 4D:
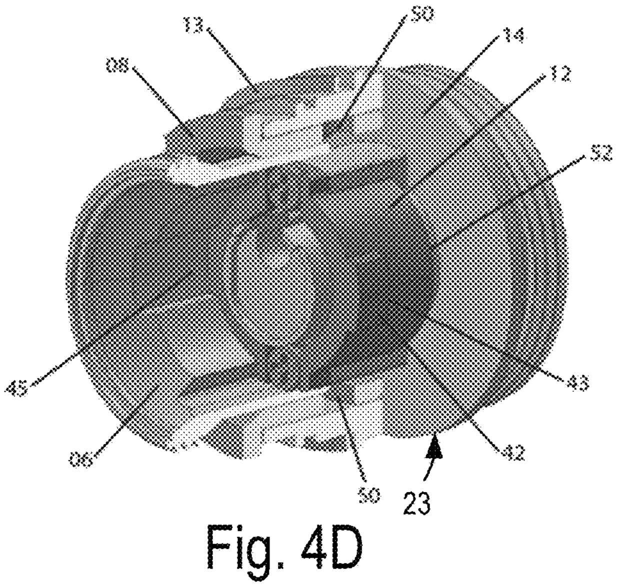
FIG. 4D depicts a cutaway view of the optic carrier 6 of FIG. 4C shifted forward in the spot beam position, in accordance with various embodiments.

FIG. 4D depicts a cutaway view of the optic carrier 6 of FIG. 4C shifted forward in the spot beam position, in accordance with various embodiments. The travel stop 46 of the short keyway 45 can go no further than the travel stop 43 of the short track 42 of the alignment track 12. The inner collar 8 is shown rotated, exposing the barrel cam grooves 50 in the cutaway view.

Figure 5B:
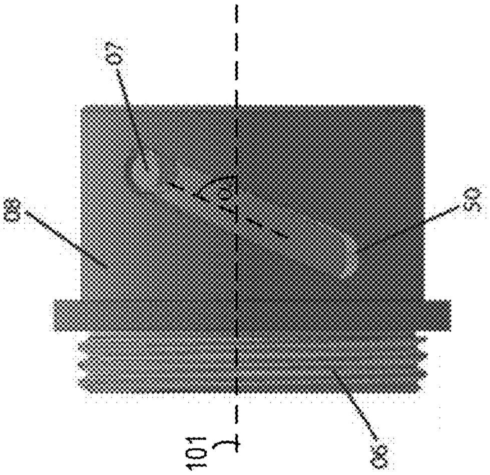
FIG. 5B depicts a side view of the barrel cam mechanism of FIG. 5A, in accordance with various embodiments.
Figure 5D:
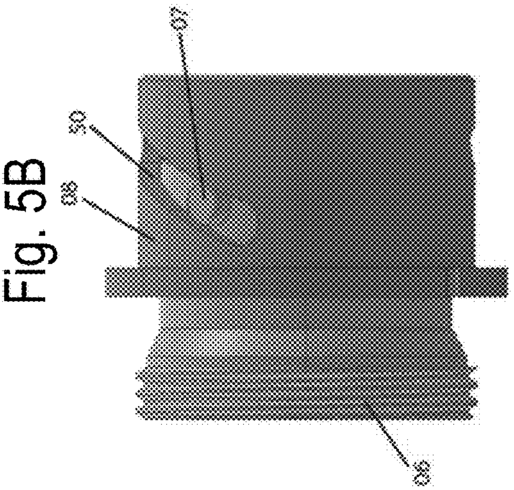
FIG. 5D depicts a side view of the barrel cam mechanism of FIG. 5C, in accordance with various embodiments.
Figure 5A:
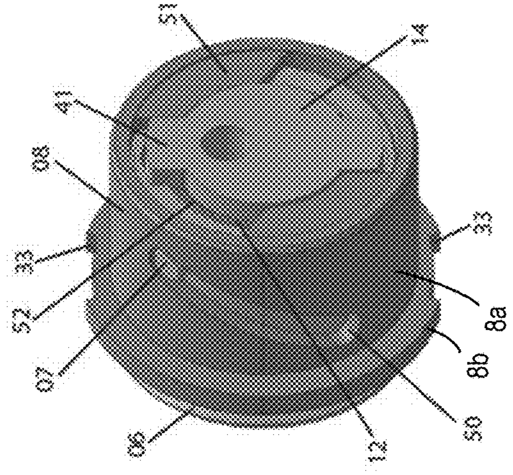
FIG. 5A depicts an inside view of a barrel cam mechanism when the optic carrier 6 is in the flood beam position, in accordance with various embodiments.

FIG. 5A depicts an inside view of a barrel cam mechanism when the optic carrier 6 is in the flood beam position, in accordance with various embodiments. The cam follower 7 rests at one end of the barrel cam groove 50 of the inside collar 8. The rotation-limiting flanges 51 of the inner collar 8 rest against the full length tracks 41 of the head frame 14, which is shown here in a cutaway view. The rotation-limiting flanges 51 secure the inner collar 8 into the head frame assembly 23 by the back wall 52 of the alignment track 12, that is screwed (by screws 10, FIG. 2A) into the head frame 14.

The inner collar 8 includes a cylindrical body 8*a* and a front rim 8*b* that extends circumferentially around the body.

FIG. 5B depicts a side view of the barrel cam mechanism of FIG. 5A, in accordance with various embodiments. This is a more simplified side view of the barrel cam mechanism in the flood beam position. The barrel cam groove 50 can extend at an angle $\alpha$ of about 50-80 degrees from the longitudinal axis 101, in an example implementation.

Figure 5C:
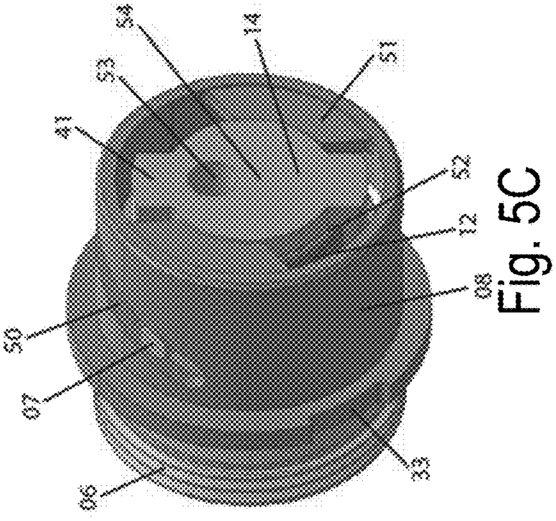
FIG. 5C depicts an inside view of the barrel cam mechanism of FIG. 5A when the optic carrier 6 is shifted forward in the spot beam position, in accordance with various embodiments.

FIG. 5C depicts an inside view of the barrel cam mechanism of FIG. 5A when the optic carrier 6 is shifted forward in the spot beam position, in accordance with various embodiments. The cam follower 7 rests towards the other end of the barrel cam groove 50 of the inside collar 8, that has been rotated. Notice the new location of the inner collar channel 33. The other side of the rotation-limiting flanges 51 of the inner collar 8 rest towards the opposite full length tracks 41 of the head frame 14, that is shown here in a cutaway view. This view also shows the wire channel 53 that is bored through the heat sink pedestal 54 of the head frame 14, to allow the LED 11 to be powered and cooled.

FIG. 5D depicts a side view of the barrel cam mechanism of FIG. 5C, in accordance with various embodiments. This is a more simplified side view of the barrel cam mechanism in the spot beam position.

Figure 6A:
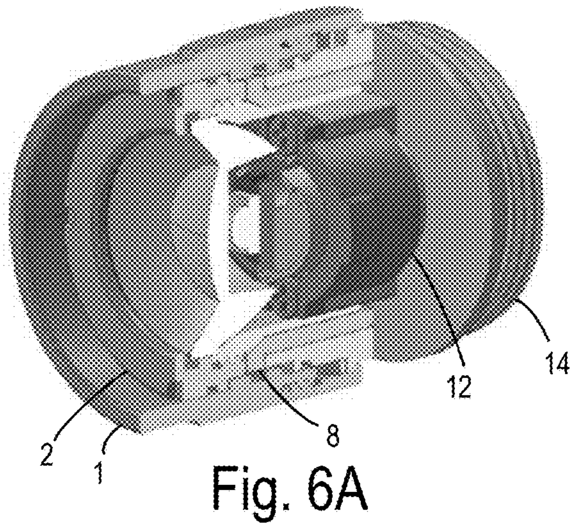
FIG. 6A depicts an additional cutaway view of the optic 120 of FIGS. 1A-1H, including the alignment track 12 of FIG. 2A, in the flood beam position, in accordance with various embodiments.

FIG. 6A depicts an additional cutaway view of the optic 120 of FIGS. 1A-1H, including the alignment track 12 of FIG. 2A, in the flood beam position, in accordance with various embodiments.

Figure 6B:
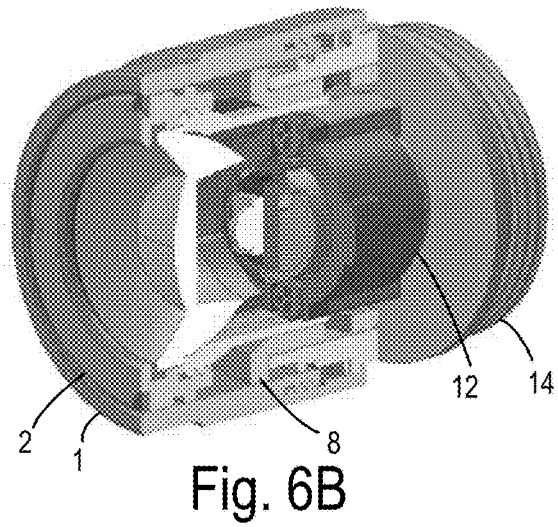
FIG. 6B depicts an additional cutaway view of the optic 120 of FIGS. 1A-1H, including the alignment track 12 of FIG. 2A, in the spot beam position, in accordance with various embodiments.

FIG. 6B depicts an additional cutaway view of the optic 120 of FIGS. 1A-1H, including the alignment track 12 of FIG. 2A, in the spot beam position, in accordance with various embodiments.

Figure 6C:
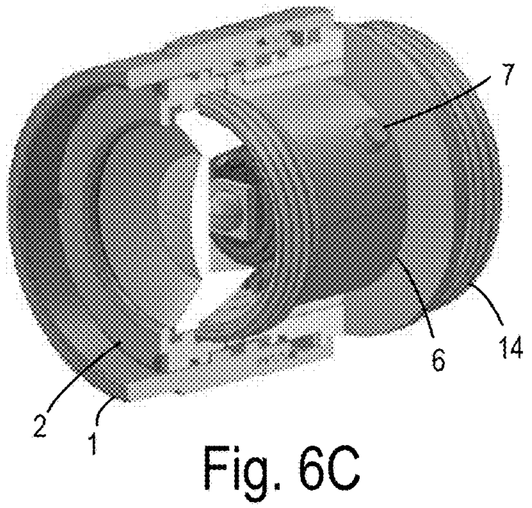
FIG. 6C depicts an additional cutaway view of the optic 120 of FIGS. 1A-1H, including the optic carrier 6 and cam follower 7 of FIG. 2A, in the flood beam position, in accordance with various embodiments.

FIG. 6C depicts an additional cutaway view of the optic 120 of FIGS. 1A-1H, including the optic carrier 6 and cam follower 7 of FIG. 2A, in the flood beam position, in accordance with various embodiments.

Figure 6D:
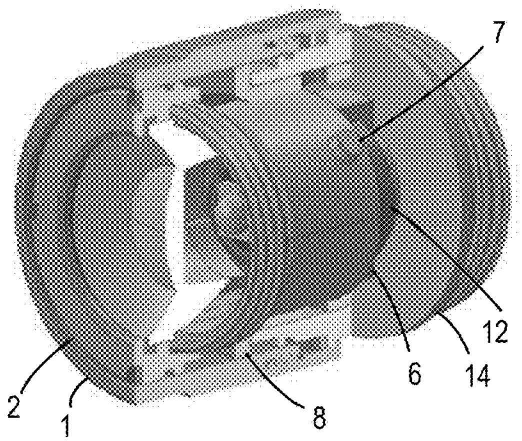
FIG. 6D depicts an additional cutaway view of the optic 120 of FIGS. 1A-1H, including the optic carrier 6 and cam follower 7 of FIG. 2A, in the spot beam position, in accordance with various embodiments.

FIG. 6D depicts an additional cutaway view of the optic 120 of FIGS. 1A-1H, including the optic carrier 6 and cam follower 7 of FIG. 2A, in the spot beam position, in accordance with various embodiments.

Figure 6E:
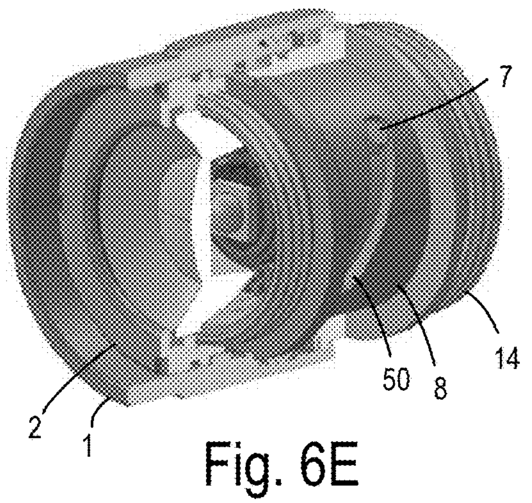
FIG. 6E depicts an additional cutaway view of the optic 120 of FIGS. 1A-1H, including the inside collar 8 of FIG. 2A, in the flood beam position, in accordance with various embodiments.

FIG. 6E depicts an additional cutaway view of the optic 120 of FIGS. 1A-1H, including the inside collar 8 of FIG. 2A, in the flood beam position, in accordance with various embodiments.

Figure 6F:
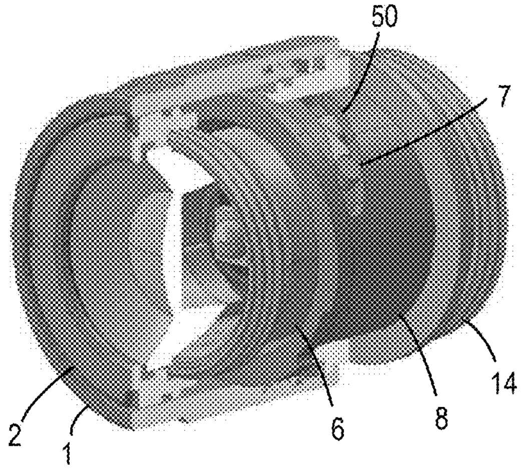
FIG. 6F depicts an additional cutaway view of the optic 120 of FIGS. 1A-1H, including the inside collar 8 of FIG. 2A, in the spot beam position, in accordance with various embodiments.

FIG. 6F depicts an additional cutaway view of the optic 120 of FIGS. 1A-1H, including the inside collar 8 of FIG. 2A, in the spot beam position, in accordance with various embodiments. Note that the cam follower 7 is at one end of the barrel cam groove 50 in FIG. 6E and at the other end of the barrel cam groove 50 in FIG. 6F. A small gap as shown may be present between the cam follower 7 and the end of the barrel cam groove 50 to prevent binding.

Figure 7A:
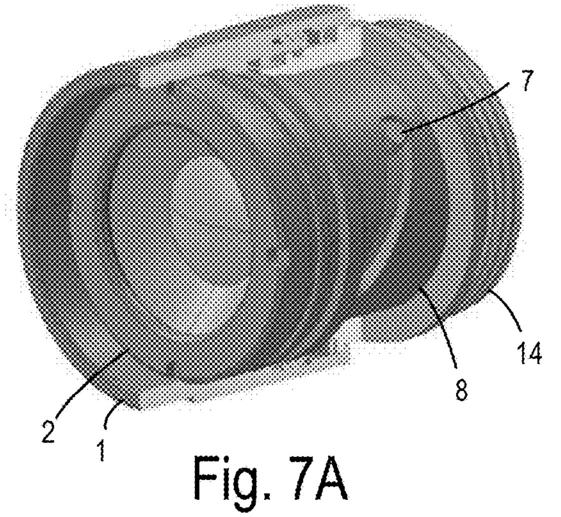
FIG. 7A depicts an additional cutaway view of the optic 120 of FIGS. 1A-1H, including the inside collar 8 of FIG. 2A, in the flood beam position, in accordance with various embodiments.

FIG. 7A depicts an additional cutaway view of the optic 120 of FIGS. 1A-1H, including the inside collar 8 of FIG. 2A, in the flood beam position, in accordance with various embodiments.

Figure 7B:
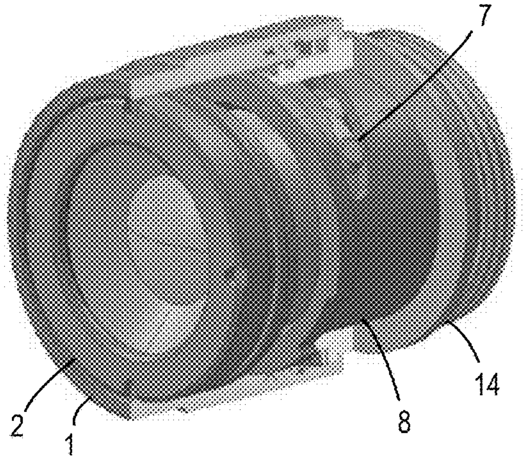
FIG. 7B depicts an additional cutaway view of the optic 120 of FIGS. 1A-1H, including the inside collar 8 of FIG. 2A, in the spot beam position, in accordance with various embodiments.

FIG. 7B depicts an additional cutaway view of the optic 120 of FIGS. 1A-1H, including the inside collar 8 of FIG. 2A, in the spot beam position, in accordance with various embodiments.

Figure 7C:
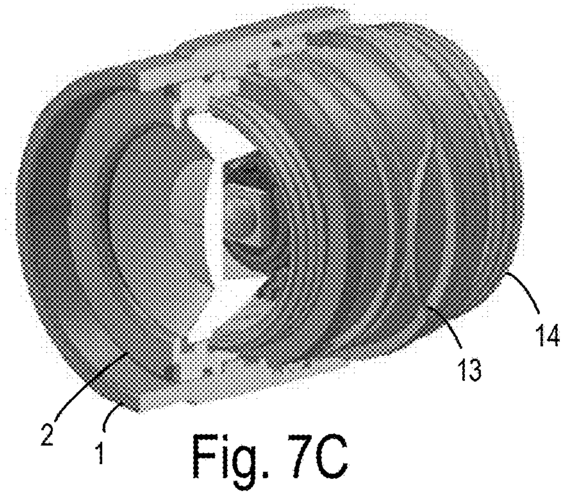
FIG. 7C depicts an additional cutaway view of the optic 120 of FIGS. 1A-1H, including the wave spring 13 of FIG. 2A, in the flood beam position, in accordance with various embodiments.

FIG. 7C depicts an additional cutaway view of the optic 120 of FIGS. 1A-1H, including the wave spring 13 of FIG. 2A, in the flood beam position, in accordance with various embodiments.

Figure 7D:
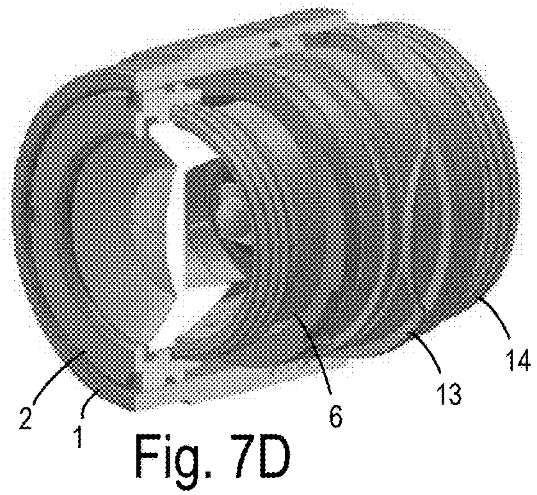
FIG. 7D depicts an additional cutaway view of the optic 120 of FIGS. 1A-1H, including the wave spring 13 of FIG. 2A, in the spot beam position, in accordance with various embodiments.

FIG. 7D depicts an additional cutaway view of the optic 120 of FIGS. 1A-1H, including the wave spring 13 of FIG. 2A, in the spot beam position, in accordance with various embodiments.

Figure 7E:
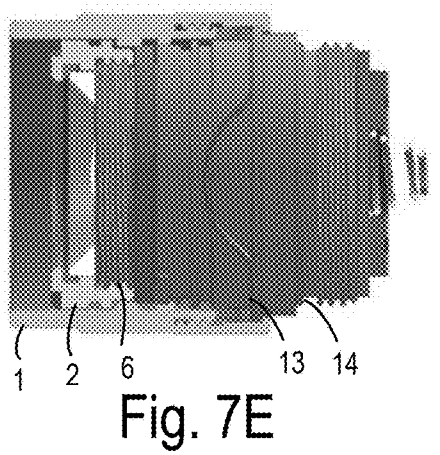
FIG. 7E depicts a cross-sectional view of the optic 120 of FIG. 7C, in accordance with various embodiments.

FIG. 7E depicts a cross-sectional view of the optic 120 of FIG. 7C, in accordance with various embodiments.

Figure 7F:
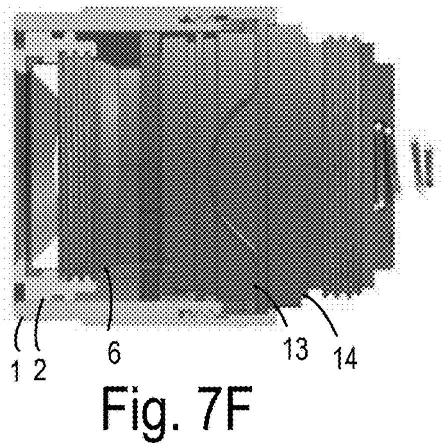
FIG. 7F depicts a cross-sectional view of the optic 120 of FIG. 7D, in accordance with various embodiments.

FIG. 7F depicts a cross-sectional view of the optic 120 of FIG. 7D, in accordance with various embodiments.

Figure 8A:
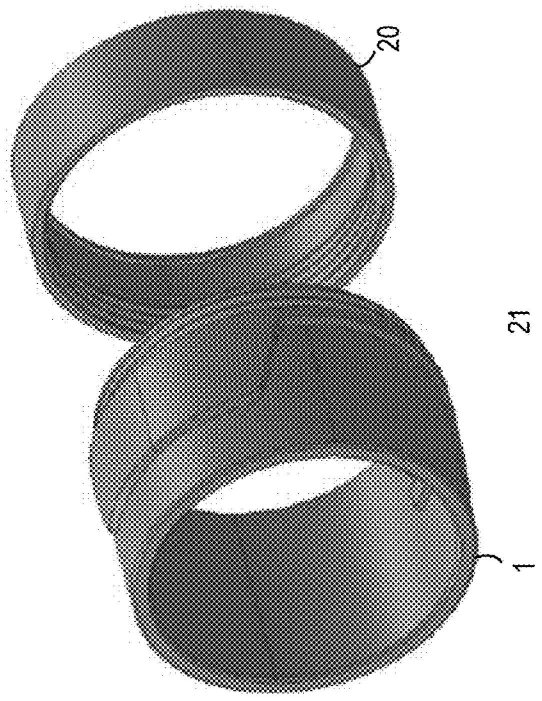
FIG. 8A depicts an exploded view of the outer collar 21 of FIG. 2A, in accordance with various embodiments.
Figure 8B:
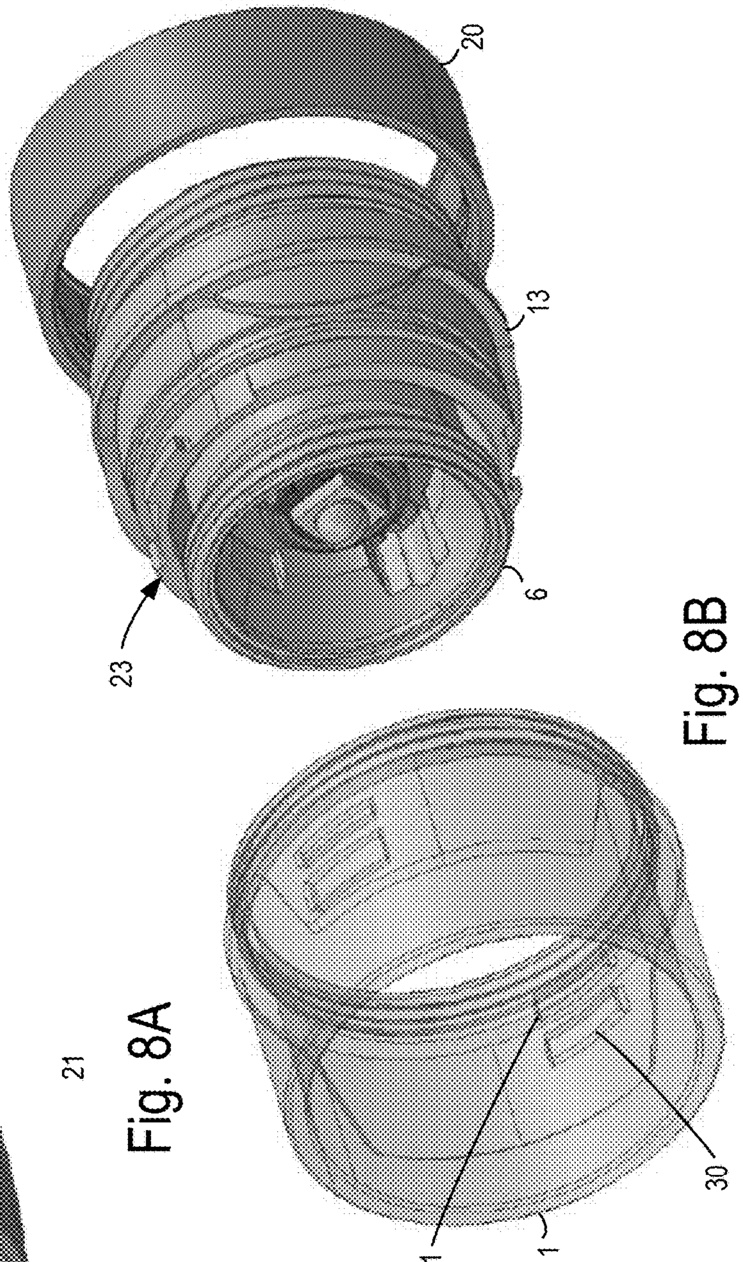
FIG. 8B depicts further details regarding the outer collar 21 and the head frame assembly 23 of FIG. 2A, in accordance with various embodiments.

FIG. 8A depicts an exploded view of the outer collar 21 of FIG. 2A, in accordance with various embodiments. The outer collar includes the outer collar front 1 and the outer collar rear 20. As mentioned, these two components may have threaded surfaces to attach to one another FIG. 8B depicts further details regarding the outer collar 21 and the head frame assembly 23 of FIG. 2A, in accordance with various embodiments. The outer collar front 1 includes tabs 30 and 31. The optic carrier 6, head frame assembly 23, spring 13, and outer collar rear 20 are depicted.

Figure 9A:
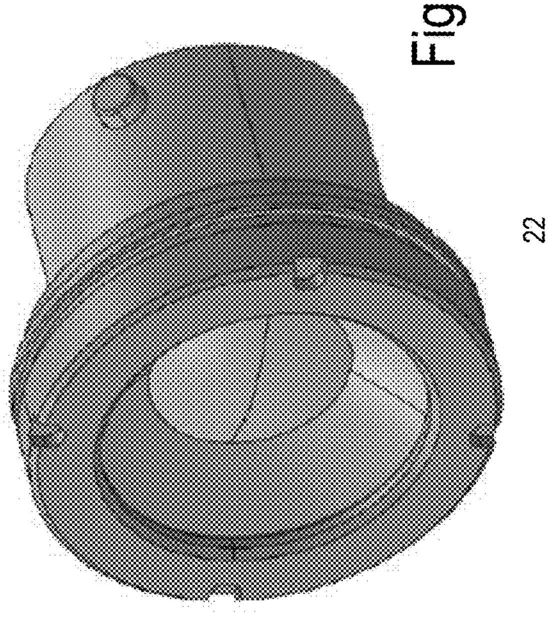
FIG. 9A depicts the optic assembly 22 of FIG. 2A, in accordance with various embodiments.

FIG. 9A depicts the optic assembly 22 of FIG. 2A, in accordance with various embodiments. The optic assembly 22 includes the front bezel 2, the bezel O-ring 3, the optic gasket 4, the optic 5 (or lens), and the optic carrier 6. The cam followers 7 are also depicted at opposing positions of the optic carrier 6.

Figure 9B:
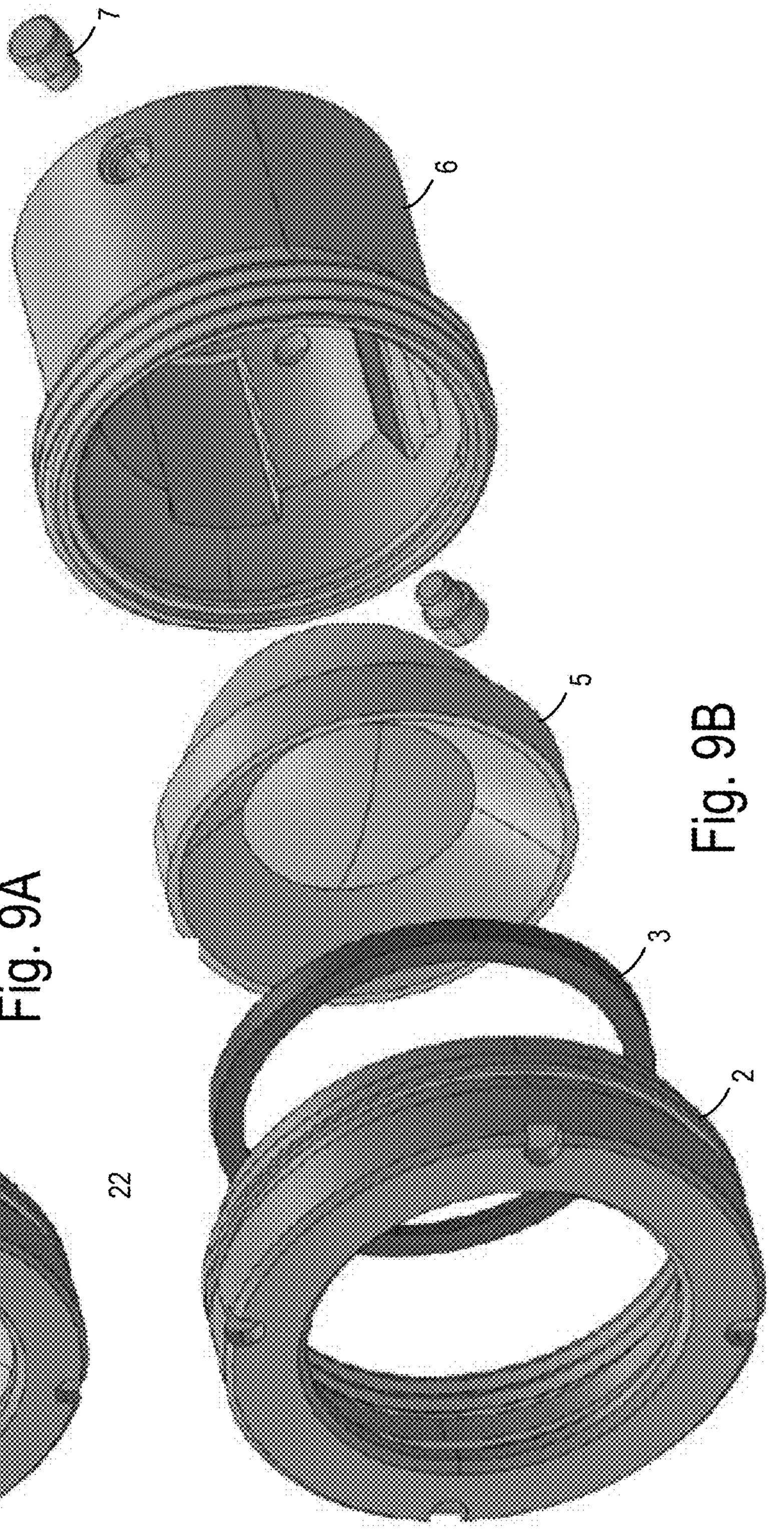
FIG. 9B depicts an exploded view of the optic assembly 22 of FIG. 9A, in accordance with various embodiments.

FIG. 9B depicts an exploded view of the optic assembly 22 of FIG. 9A, in accordance with various embodiments.

Figure 10A:
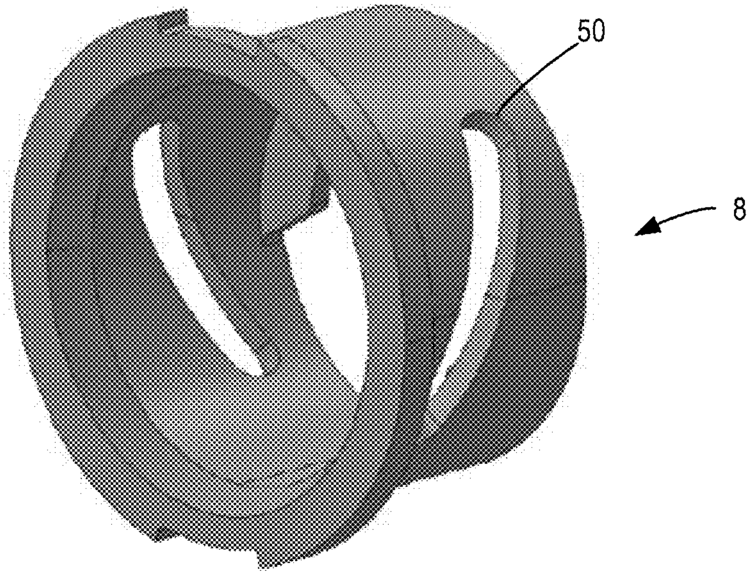
FIG. 10A depicts a front-side view of the inner collar 8 of FIG. 2A, in accordance with various embodiments.

FIG. 10A depicts a front-side view of the inner collar 8 of FIG. 2A, in accordance with various embodiments. The inner collar includes opposing grooves 50, in an example implementation.

Figure 10B:
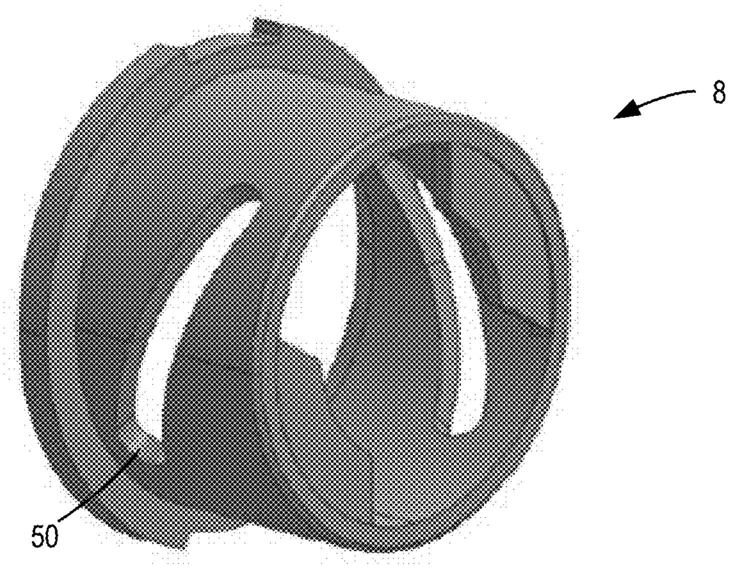
FIG. 10B depicts a rear-side view of the inner collar 8 of FIG. 10A, in accordance with various embodiments.

FIG. 10B depicts a rear-side view of the inner collar 8 of FIG. 10A, in accordance with various embodiments.

Figures 11A, 11B, 11C:
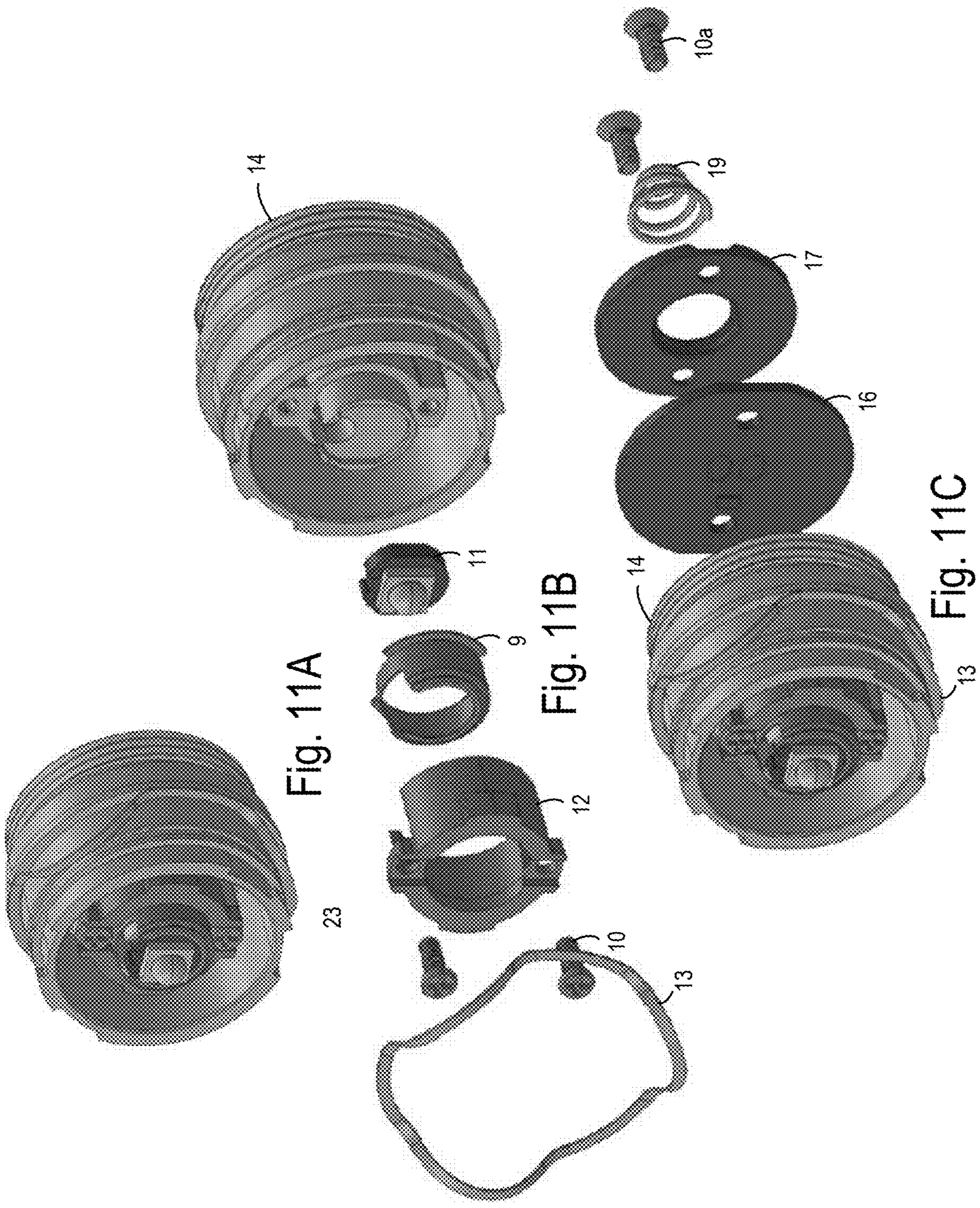
FIG. 11A depicts the head frame assembly 23 of FIG. 2A, in accordance with various embodiments.
FIG. 11B depicts an exploded view of the head frame assembly 23 of FIG. 11A, in accordance with various embodiments.
FIG. 11C depicts another exploded view of the head frame assembly 23 of FIG. 11A, in accordance with various embodiments.

FIG. 11A depicts the head frame assembly 23 of FIG. 2A, in accordance with various embodiments.

FIG. 11B depicts an exploded view of the head frame assembly 23 of FIG. 11A, in accordance with various embodiments. This view depicts the spring 13, the head inner screws 10, the alignment track 12, the LED sleeve 9, the LED 11, and the head frame 14.

FIG. 11C depicts another exploded view of the head frame assembly 23 of FIG. 11A, in accordance with various embodiments. This view depicts the spring 13, the head frame 14, the PCB 16, the head tail cap 17, the contact spring 19, and head outer screws 10*a*.

Figure 12A:
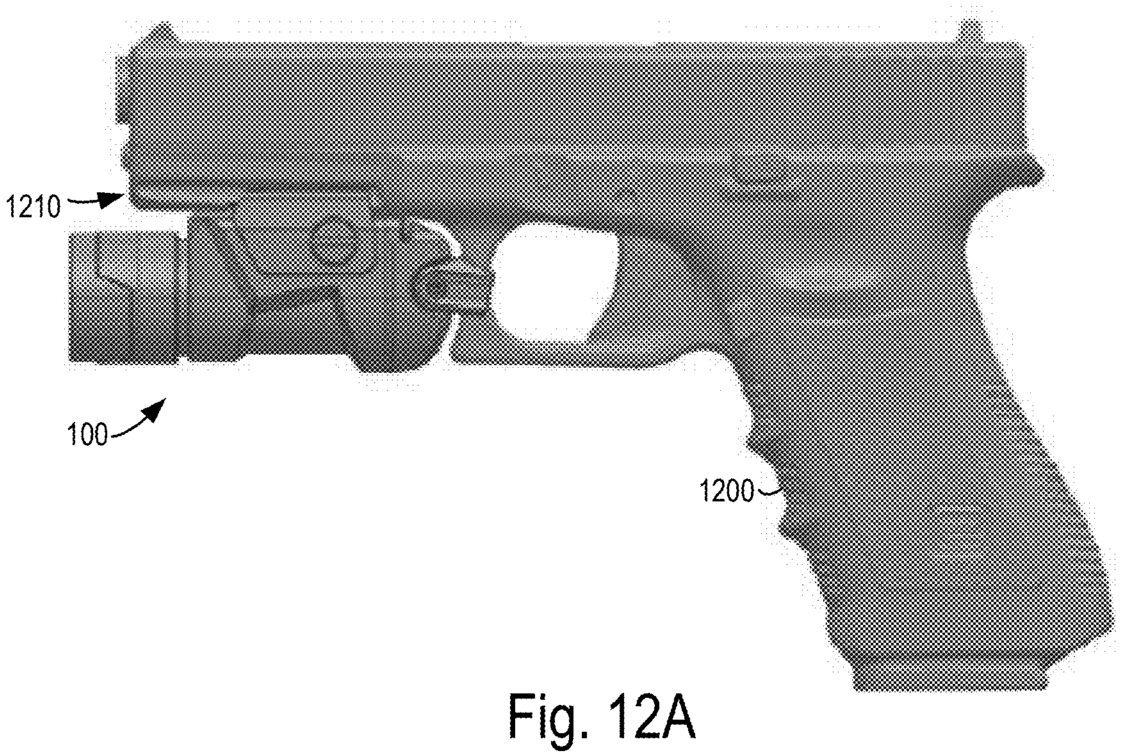
FIG. 12A depicts an example side view of the light assembly 100 of FIG. 1A attached to a handgun 1200, in accordance with various embodiments.

FIG. 12A depicts an example side view of the light assembly 100 of FIG. 1A attached to a handgun 1200, in accordance with various embodiments. The light assembly is attached to a rail 1210 or other mounting structure of the handgun. As mentioned, many handguns have an integrated rail such as a Picatinny or Weaver style rail under the barrel, which provides a convenient mounting structure for the light assembly 100.

Figure 12B:
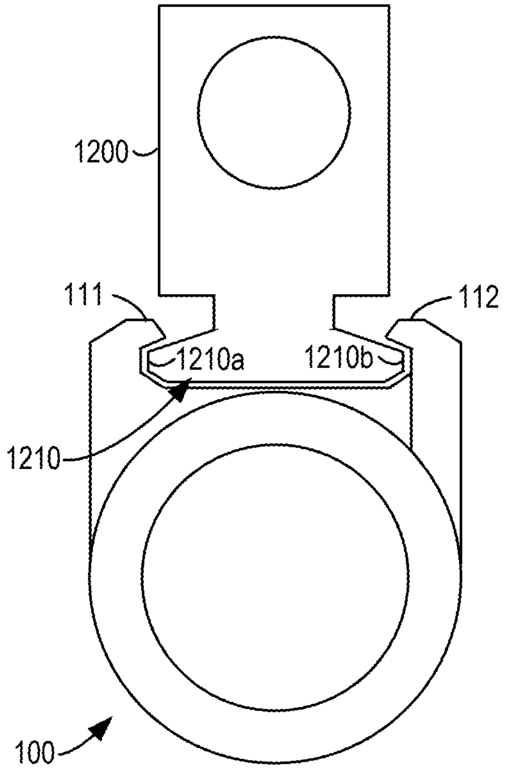
FIG. 12B depicts an example front view of the light assembly 100 and handgun 1200 of FIG. 12A, in accordance with various embodiments.

FIG. 12B depicts an example front view of the light assembly 100 and handgun 1200 of FIG. 12A, in accordance with various embodiments. The rail 1210 includes opposing edges 1210*a* and 1210*b* that are engaged by corresponding opposing clamping members 111 and 112, respectively, of the light assembly body 110. The body may be positioned at a desired location along the barrel and then fastened in place by a screw or other fastener, for example. The clamping member 112 may be part of a removable piece which attached to the body with a screw, for example. The rail may include one or more channels on its underside which designate specific positions at which the body can be attached to the rail.

Figure 13:
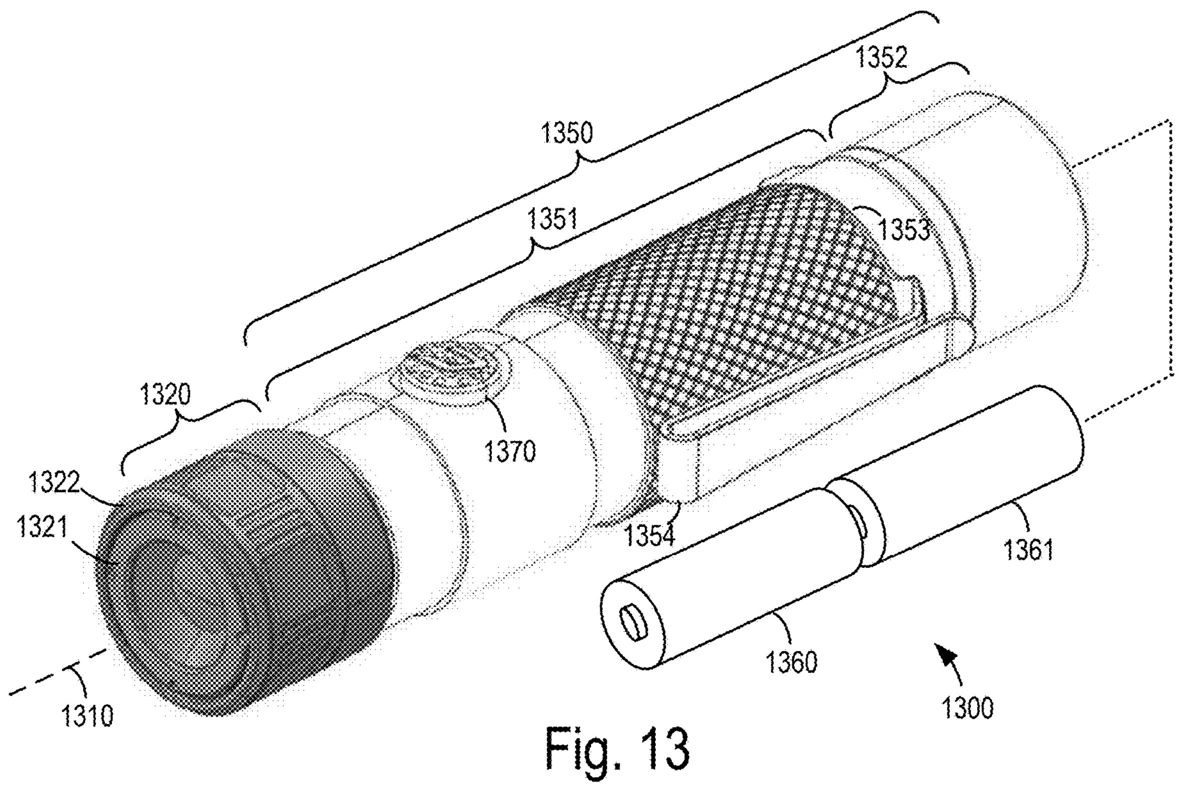
FIG. 13 depicts a front-side view of an example hand-held light 1300 including a body 1350 and an optic 1320 in a spot beam configuration, in accordance with various embodiments.

FIG. 13 depicts a front-side view of an example hand-held light 1300 including a body 1350 and an optic 1320 in a spot beam configuration, in accordance with various embodiments. The optic 1320 may correspond to the optic 120, discussed above. The optic 1320 may be attached to an elongated body 1350 which is cylindrical in this example. The front end of the elongated body 1350 may be threaded to allow it to be attached to the threaded head frame 14. The body may house a power source such as batteries 1360 and 1361 and include a switch 1370. The switch is accessible externally to allow the user to control the operation of the light. In an example implementation, the switch cycles between high, low, flashing and off modes with each press. The switch may be coupled to the power source and the optic using appropriate circuits and conductive paths.

The body 1350 may include a main portion 1351 and a removeable tail cap 1352 which allows the batteries to be replaced. An exterior of the main portion may include a knurled surface 1353 to provide a better grip for the user's hand, and a clip 1354.

The longitudinal axis of the body 1350 may be co-axial with the longitudinal axis 1310 of the optic. In another example implementation, the elongated body is not co-axial but may extend at an angle such as a right angle to the longitudinal axis of the optic.

The optic 1320 incudes an optic assembly 1321 which is movable axially relative to an outer collar 1322 between a flood beam position and a spot beam position (shown). The optic assembly is closer to the front of the outer collar when in the spot beam position than when in the flood beam position. The optic assembly can be moved axially by pulling the collar back to an unlock position, then rotating and releasing the collar, as discussed above.

Figure 14:
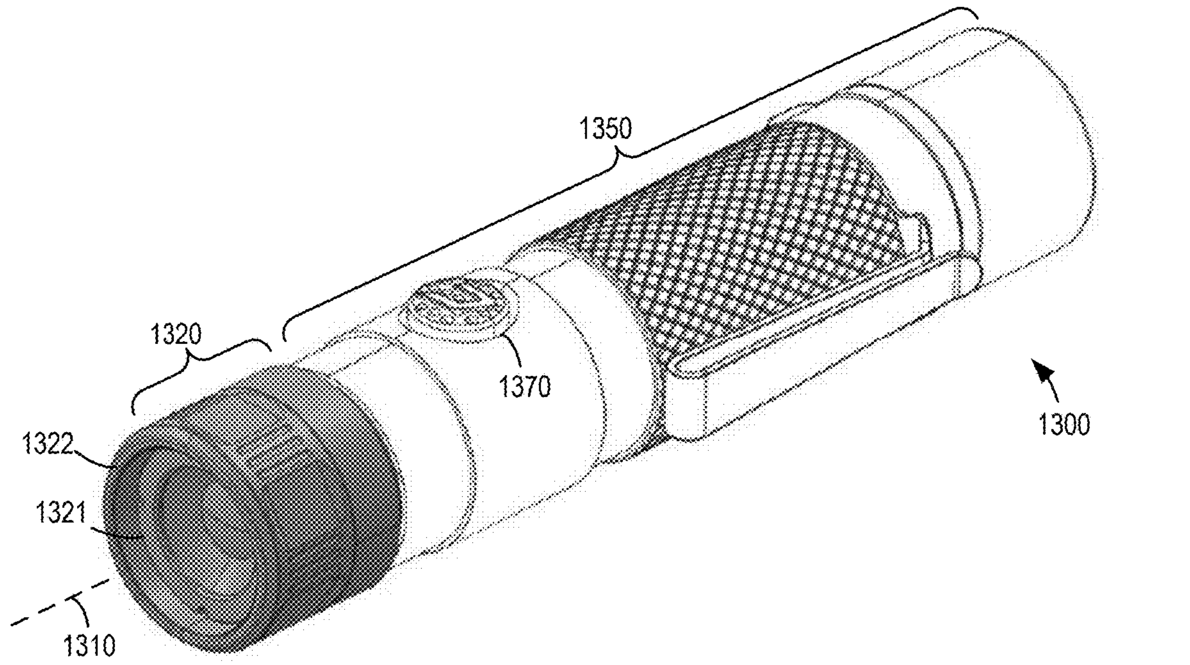
FIG. 14 depicts a front-side view of the example hand-held light 1300 with the optic 1320 in a flood beam configuration, in accordance with various embodiments.

FIG. 14 depicts a front-side view of the example hand-held light 1300 with the optic 1320 in a flood beam configuration, in accordance with various embodiments. The optic assembly 1321 has been moved axially relative to the outer collar 1322 so that it is further from the front of the outer collar than when in the spot beam position.

Figure 15:
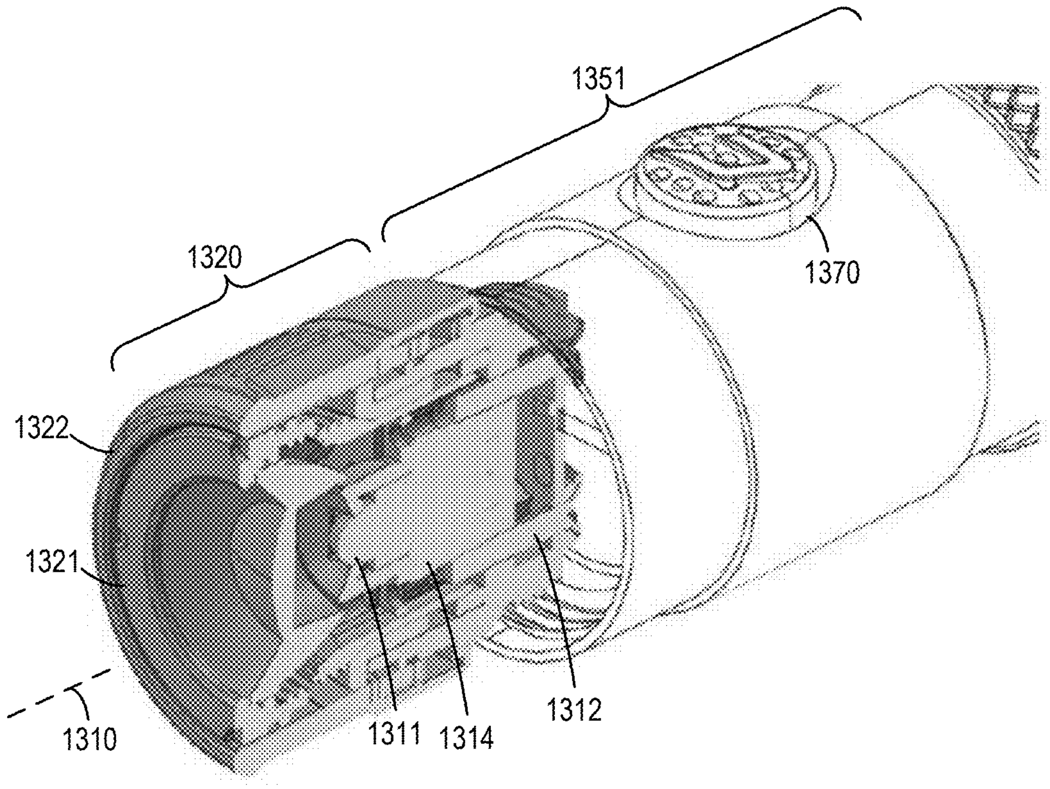
FIG. 15 depicts a front-side view of the example hand-held light 1300 in the spot beam configuration, with the optic 1320 shown in a cross-sectional view, in accordance with various embodiments.

FIG. 15 depicts a front-side view of the example hand-held light 1300 in the spot beam configuration, with the optic 1320 shown in a cross-sectional view, in accordance with various embodiments. The optic includes a light source 1311 within a head frame 1314, within an alignment track 1312.

Figure 16:
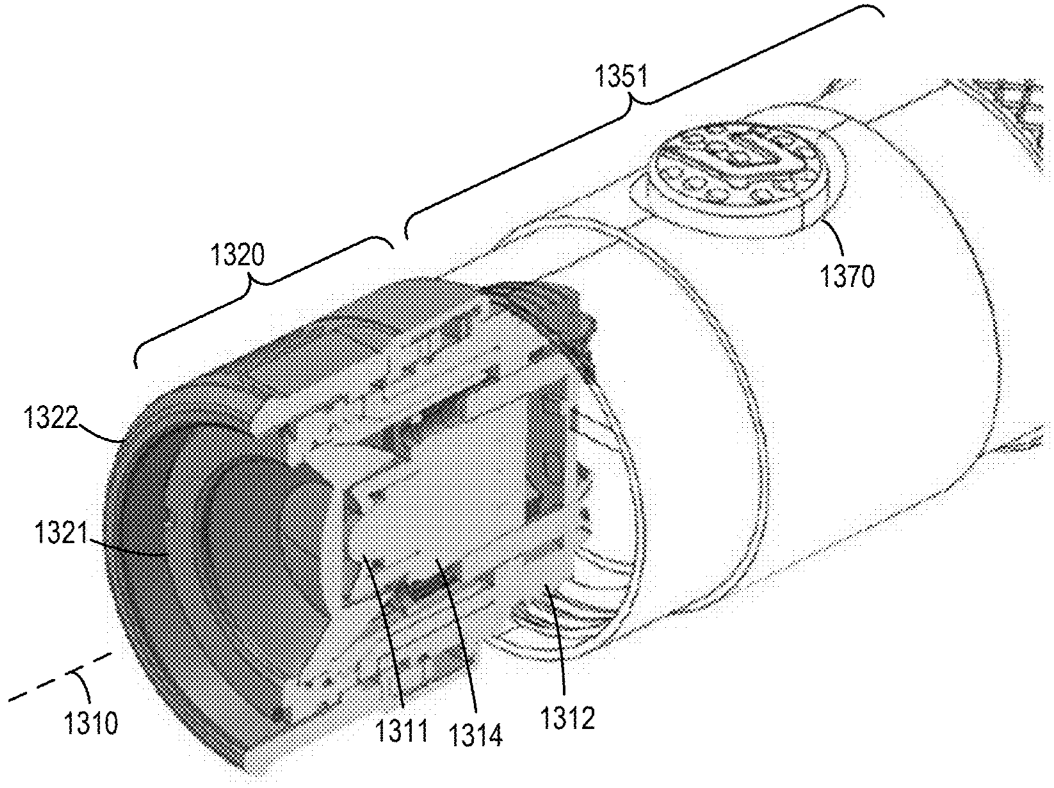
FIG. 16 depicts a front-side view of the example hand-held light 1300 in the flood beam configuration, with the optic 1320 shown in a cross-sectional view, in accordance with various embodiments.

FIG. 16 depicts a front-side view of the example hand-held light 1300 in the flood beam configuration, with the optic 1320 shown in a cross-sectional view, in accordance with various embodiments.

Figure 17:
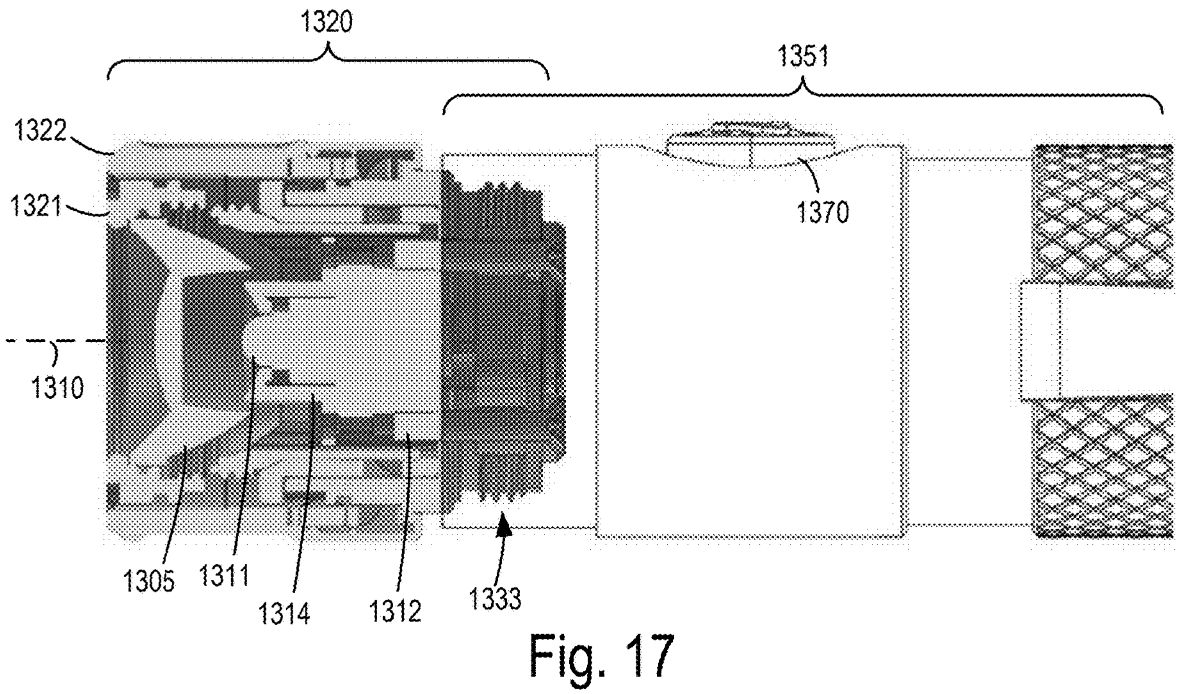
FIG. 17 depicts a side view of the example hand-held light 1300 in the spot beam configuration, with the optic 1320 shown in a cross-sectional view, in accordance with various embodiments.

FIG. 17 depicts a side view of the example hand-held light 1300 in the spot beam configuration, with the optic 1320 shown in a cross-sectional view, in accordance with various embodiments. The optic includes a lens 1305, and a light source 1311 within a head frame 1314, within an alignment track 1312. A rear threaded portion 1333 of the head frame assembly is also depicted. This threaded portion can be attached to a corresponding threaded portion at a front interior of the main portion 1351.

Figure 18:
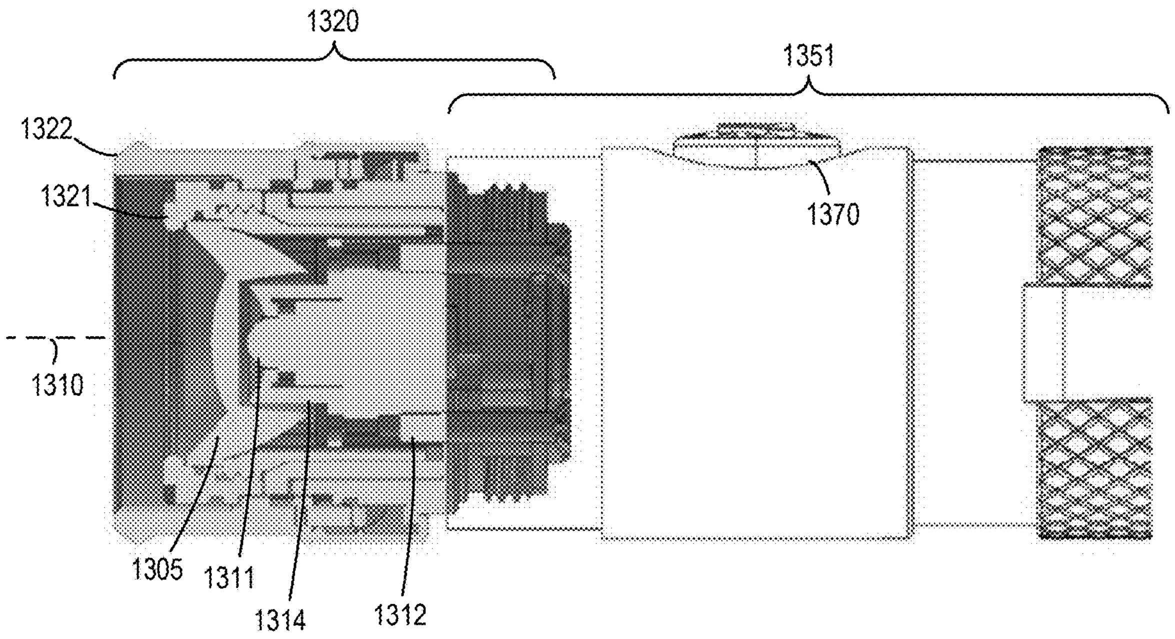
FIG. 18 depicts a side view of the example hand-held light 1300 in the flood beam configuration, with the optic 1320 shown in a cross-sectional view, in accordance with various embodiments.

FIG. 18 depicts a side view of the example hand-held light 1300 in the flood beam configuration, with the optic 1320 shown in a cross-sectional view, in accordance with various embodiments.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An apparatus, comprising:
- a head frame assembly including a spring and a light source;
- an inner collar within the head frame assembly, wherein the inner collar is rotatable relative to the head frame assembly about a longitudinal axis of the head frame assembly;
- an optic assembly including a lens facing frontward in the apparatus, wherein the optic assembly is within the inner collar and is moveable axially; and
- an outer collar surrounding the head frame assembly, the inner collar and the optic assembly, wherein the outer collar is moveable axially and rotatable about the longitudinal axis.

2. The apparatus of claim 1, wherein:
- the inner collar comprises a cylindrical body and a front rim coupled to the cylindrical body;
- the front rim has a notch; and
- an inner wall of the outer collar includes a tab to engage the notch when the inner collar is pushed rearward against a bias of the spring.

3. The apparatus of claim 2, wherein the inner collar is rotatable with the outer collar about the longitudinal axis when the tab engages the notch.

4. The apparatus of claim 1, wherein:
- the inner collar comprises a groove extending along a cylindrical body of the inner collar;
- the optic assembly comprises a pin extending from a cylindrical body of the optic assembly; and
- the pin and the optic assembly are movable axially frontward when the inner collar rotates about the longitudinal axis in a first direction, and axially rearward when the inner collar rotates about the longitudinal axis in a second direction, opposite the first direction.

5. The apparatus of claim 4, wherein the inner collar comprises back flanges configured to limit rotation of the inner collar about the longitudinal axis.

6. The apparatus of claim 4, wherein the optic assembly comprises a cylindrical optic carrier from which the pin extends and a front bezel attached to the lens and the cylindrical optic carrier.

7. The apparatus of claim 4, wherein the groove extends at an angle of about 50-80 degrees from the longitudinal axis.

8. The apparatus of claim 1, wherein:
- a cylindrical outer wall of the head frame assembly comprises a locking block and first and second locking channels on opposing ends of the locking block;
- an inner wall of the outer collar includes a first tab and a second tab rearward of the first tab;
- the first tab is configured to engage a notch at a cylindrical outer wall of the inner collar to make the inner collar non-rotatable with respect to the outer collar;
- the second tab is configured to engage the first or second locking channel when the inner collar is biased frontward by the spring.

9. The apparatus of claim 8, wherein the second tab is configured to disengage the first or second locking channel, and is rotatable about the longitudinal axis between the first and second locking channels, when the inner collar is pushed rearward against a bias of the spring.

10. The apparatus of claim 8, wherein:

an axial distance between the first and second tabs is fixed; and the first tab is configured to engage the notch at different axial positions according to different axial positions of the second tab.

11. The apparatus of claim 1, wherein:

the optic assembly is movable axially and relative to the light source between a flood beam position and a spot beam position; and a distance between the light source and the lens is greater when the optic assembly is in the spot beam position than when the optic assembly is in the flood beam position.

12. The apparatus of claim 11, wherein a length of the apparatus when the optic assembly is in the spot beam position is no greater than a length of the apparatus when the optic assembly is in the flood beam position.

13. The apparatus of claim 1, further comprising a light assembly body having opposing clamping members configured to engage a rail, wherein the head frame assembly is configured to attach to the light assembly body.

14. The apparatus of claim 13, wherein the rail is part of a firearm.

15. The apparatus of claim 1, wherein the head frame assembly, inner collar, optic assembly and outer collar are cylindrical.

16. The apparatus of claim 15, further comprising a cylindrical body configured to attach to the head frame assembly, wherein the cylindrical body comprises a switch and a power source.

17. The apparatus of claim 1, further comprising an elongated body configured to attach to the head frame assembly, wherein the elongated body comprises a switch and a power source.

18. A hand-held light, comprising:

a head frame assembly including a spring and a light source;

an inner collar within the head frame assembly, wherein the inner collar is rotatable relative to the head frame assembly about a longitudinal axis of the head frame assembly;

an optic assembly including a lens facing frontward, wherein the optic assembly is within the inner collar and is moveable axially;

an outer collar surrounding the head frame assembly, the inner collar and the optic assembly, wherein the outer collar is moveable parallel to the longitudinal axis and rotatable about the longitudinal axis; and an elongated body configured to attach to the head frame assembly.

19. The hand-held light of claim 18, wherein the elongated body comprises a switch and a power source.

20. The hand-held light of claim 18, wherein the elongated body is cylindrical.

* * * * *